United States Patent
Stirling-Gallacher et al.

(10) Patent No.: US 11,483,791 B2
(45) Date of Patent: *Oct. 25, 2022

(54) SYSTEM AND METHOD FOR NETWORK POSITIONING OF DEVICES IN A BEAMFORMED COMMUNICATIONS SYSTEM

(71) Applicant: Futurewei Technologies, Inc., Plano, TX (US)

(72) Inventors: Richard Stirling-Gallacher, San Diego, CA (US); Nathan Edward Tenny, San Diego, CA (US); Bin Liu, San Diego, CA (US); Pengfei Xia, San Diego, CA (US); Aimin Justin Sang, San Diego, CA (US); Jian Luo, Munich (DE)

(73) Assignee: Futurewei Technologies, Inc., Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/703,449

(22) Filed: Dec. 4, 2019

(65) Prior Publication Data

US 2020/0187146 A1 Jun. 11, 2020

Related U.S. Application Data

(63) Continuation of application No. 15/587,621, filed on May 5, 2017, now Pat. No. 10,512,056.

(51) Int. Cl.
*H04W 64/00* (2009.01)
*H04B 7/06* (2006.01)
(Continued)

(52) U.S. Cl.
CPC ............. *H04W 64/00* (2013.01); *G01S 1/54* (2013.01); *G01S 5/0036* (2013.01);
(Continued)

(58) Field of Classification Search
CPC ..... H04W 4/023; H04W 24/08; H04W 40/04; H04W 64/00; H04B 7/0413; H04L 5/005; H04L 5/0007; G01S 1/10
(Continued)

(56) References Cited

U.S. PATENT DOCUMENTS

| | | |
|---|---|---|
| 2001/0022558 A1 | 9/2001 | Karr, Jr. et al. |
| 2013/0188510 A1 | 7/2013 | Siomina et al. |

(Continued)

FOREIGN PATENT DOCUMENTS

| | | |
|---|---|---|
| CN | 101459930 A | 6/2009 |
| CN | 106341882 A | 1/2017 |

(Continued)

OTHER PUBLICATIONS

Fischer, "Observed Time Difference of Arrival (OTDOA) Positioning in 3GPP LTE," Qualcomm Technologies, Inc., Jun. 6, 2014, 62 pages.

(Continued)

*Primary Examiner* — Phuoc H Doan
(74) *Attorney, Agent, or Firm* — Slater Matsil, LLP

(57) ABSTRACT

A method for receiving device position determination includes receiving beamformed position reference signals (BF-PRSs) on a plurality of communications beams from at least two transmitting devices in accordance with a BF-PRS configuration, making at least one observed time difference of arrival (OTDOA) measurement in accordance with the BF-PRSs on the plurality of communications beams, and transmitting OTDOA feedback including the at least one OTDOA measurement.

28 Claims, 9 Drawing Sheets

(51) Int. Cl.
*G01S 1/54* (2006.01)
*G01S 5/02* (2010.01)
*G01S 5/00* (2006.01)
*G01S 5/10* (2006.01)
*H04B 7/04* (2017.01)
*H04W 16/28* (2009.01)

(52) U.S. Cl.
CPC .......... *G01S 5/0205* (2013.01); *G01S 5/0236* (2013.01); *G01S 5/10* (2013.01); *H04B 7/04* (2013.01); *H04B 7/0617* (2013.01); *H04W 16/28* (2013.01)

(58) Field of Classification Search
USPC .................................................. 370/328, 329
See application file for complete search history.

(56) References Cited

U.S. PATENT DOCUMENTS

| | | | |
|---|---|---|---|
| 2014/0162704 A1 | 6/2014 | Young et al. | |
| 2014/0349677 A1 | 11/2014 | Xiao et al. | |
| 2015/0188678 A1* | 7/2015 | Wu | H04B 7/0617 370/329 |
| 2016/0295366 A1* | 10/2016 | Priyanto | H04B 7/0413 |
| 2016/0302165 A1 | 10/2016 | Da et al. | |
| 2017/0026962 A1 | 1/2017 | Liu et al. | |
| 2017/0033904 A1 | 2/2017 | Stirling-Gallacher et al. | |
| 2017/0223552 A1 | 8/2017 | Roy et al. | |
| 2018/0310127 A1 | 10/2018 | Xia et al. | |

FOREIGN PATENT DOCUMENTS

| | | |
|---|---|---|
| WO | 2010145568 A1 | 12/2010 |
| WO | 2014036150 A1 | 3/2014 |
| WO | 2016032308 A1 | 3/2016 |
| WO | 2016142776 A2 | 9/2016 |
| WO | 2016164085 A1 | 10/2016 |

OTHER PUBLICATIONS

Hughes Systique Corp., "Positioning Techniques for mobile devices in LTE https://hsc.com/Blog/Positioning-techniques-for-mobile-devices-in-LTE," Jul. 16, 2015, 9 pages.
Koivisto, et al., "High-Efficiency Device Positioning and Location-Aware Communications in Dense 5G Networks," https://arxiv.org/pdf/1608.03775.pdf, Apr. 23, 2017, 8 pages.
Thorpe, et al., "LTE Location Based Services Technology Introduction White Paper," White Paper, Apr. 2013, 22 pages.
LG Electronics, "Discussion on potential enhancements for indoor positioning", 3GPP TSG RAN WG1 Meeting #80, R1-150229, Feb. 9-13, 2015, 4 Pages, Athens, Greece.
Nokia Networks, "TP for TR37.857 on EB/FD-MIMO based positioning", 3GPP TSG-RAN WG1 #82, R1-154772, Aug. 24-28, 2015, 5 Pages, Beijing, China.

* cited by examiner

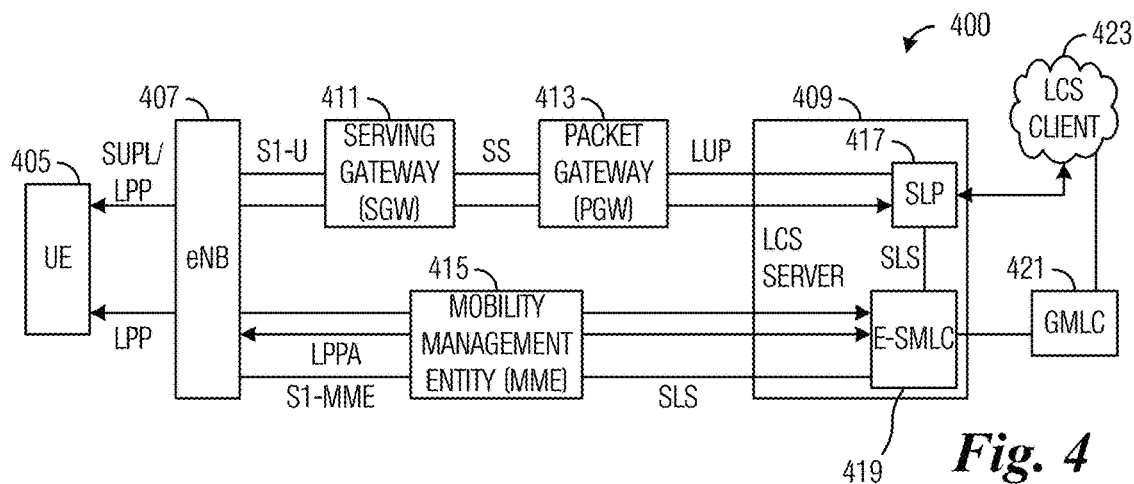
*Fig. 4*
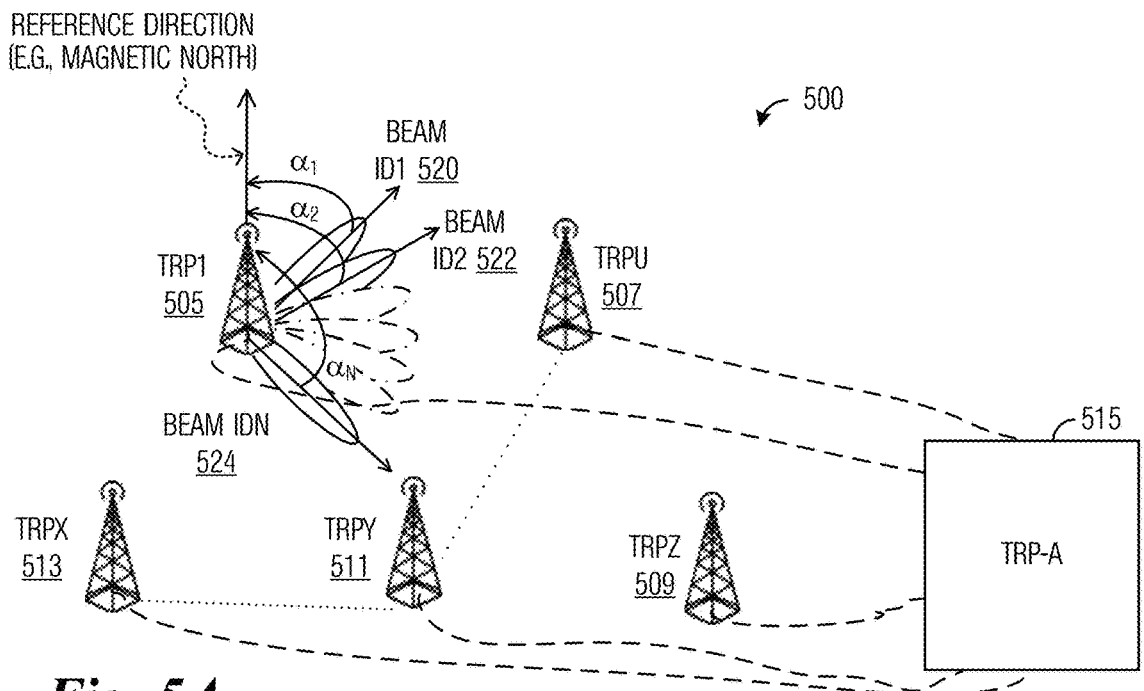
*Fig. 5A*
*Fig. 5B*

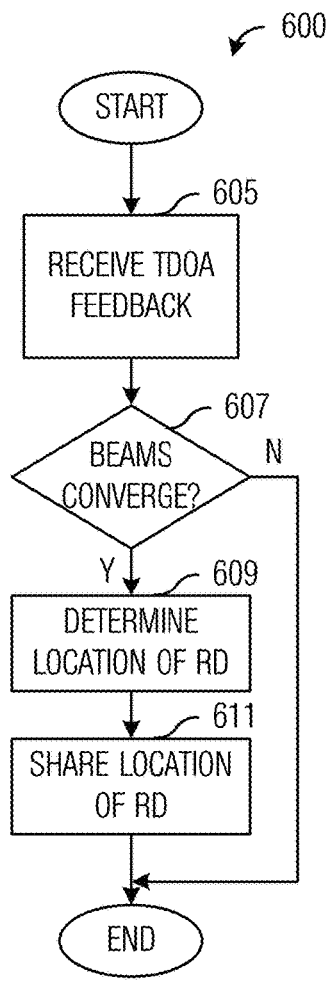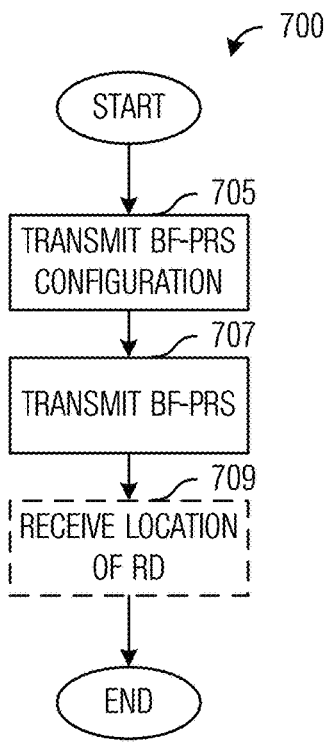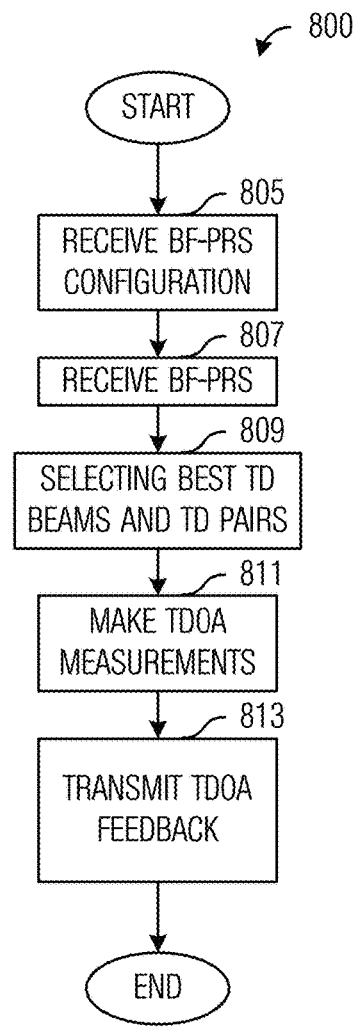
Fig. 6
Fig. 7
Fig. 8

SYSTEM AND METHOD FOR NETWORK POSITIONING OF DEVICES IN A BEAMFORMED COMMUNICATIONS SYSTEM

CROSS-REFERENCE TO RELATED APPLICATIONS

This application is a continuation of U.S. application Ser. No. 15/587,621, filed on May 5, 2017, entitled "System and Method for Network Positioning of Devices in a Beamformed Communications System" which application is hereby incorporated herein by reference.

TECHNICAL FIELD

The present disclosure relates generally to a system and method for digital communications, and, in particular embodiments, to a system and method for network positioning of devices in a beamformed communications system.

BACKGROUND

Knowing the position or location of a communications device is important in modern communications systems. The position of the communications device may be used to provide lifesaving services for emergency calls and is a requirement by operators in certain regions to meet statutory requirements. Furthermore, position information of the communications device may be used to support commercial services, such as location based services (LBS) for shopping, tourism, gaming, transport on demand, and so on.

In traditional communications systems, a variety of techniques may be used for determining the position of a device, including time difference of arrival (TDOA) or observed time difference of arrival (OTDOA) from a number of different TRPs, global navigation satellite system (GNSS) and/or enhanced cell ID (E-CID). In particular, the Third Generation Partnership Project (3GPP) Long Term Evolution (LTE) Release 10 supports the use of E-CID, assisted (A-GNSS), and OTDOA.

SUMMARY

Example embodiments provide a system and method for network positioning of devices in a beamformed communications system.

In accordance with an example embodiment, a method for receiving device position determination is provided. The method includes receiving, by a receiving device, beamformed position reference signals (BF-PRSs) on a plurality of communications beams from at least two transmitting devices in accordance with a BF-PRS configuration, making, by the receiving device, at least one observed time difference of arrival (OTDOA) measurement in accordance with the BF-PRSs on the plurality of communications beams, and transmitting, by the receiving device, OTDOA feedback including the at least one OTDOA measurement.

The BF-PRS configuration includes at least one of indications of network resources used to convey the BF-PRSs to the receiving device, or a mapping of communications beam identifier to network resource for each transmitting device. Making the at least one OTDOA measurement includes selecting, by the receiving device, at least one communications beam of each transmitting device in accordance with a selection criterion, identifying, by the receiving device, at least one transmitting device pair from the at least two transmitting devices in accordance with the at least one communications beam of each transmitting device, wherein the at least one transmitting device pair comprises one communications beam for each transmitting device in the at least one transmitting device pair, and determining, by the receiving device, the at least one OTDOA measurement in accordance with time of arrivals associated with the communications beams of the at least one transmitting device pair.

The OTDOA feedback further includes identifying information of communications beams of the at least one transmitting device pair, and received signal strengths of the BF-PRSs received on the communications beams of the at least one transmitting device pair. The OTDOA feedback further comprises received signal strengths of neighboring communications beams of the communications beams of the at least one transmitting device pair. The at least one communications beam of each transmitting device is selected in accordance with at least one of identifiers of the at least one communications beam of each transmitting device differ by more than a first minimum value, or the at least one OTDOA measurement is greater than a second minimum value.

In accordance with an example embodiment, a method for device position determination is provided. The method includes transmitting, by a transmitting device, a BF-PRS configuration including at least one of indications of network resources used to convey the BF-PRSs to a receiving device, or a mapping of communications beam identifier to network resource for the transmitting device, and transmitting, by a transmitting device, BF-PRSs on a plurality of communications beams in accordance with the BF-PRS configuration.

There is a plurality of transmitting devices, and the BF-PRS configuration also includes at least one of indications of network resources used to convey the BF-PRSs to the receiving device, or a mapping of communications beam identifier to network resource for at least one other transmitting device.

In accordance with an example embodiment, a method for position determination of a second device is provided. The method includes receiving, by a first device, time difference of arrival (TDOA) feedback from a third device, the TDOA feedback includes at least one TDOA measurement, identifiers of communications beams associated with the at least one TDOA measurement, and determining, by the first device, a location of the second device in accordance with the TDOA feedback.

The location of the second device is determined in accordance with a TRP-A including angular information of communications beams of transmitting or receiving devices and position information of third devices. The angular information includes a mapping of identifiers of communications beams to angles referenced to a specified direction. The TDOA feedback further comprises received signal strengths of BF-PRSs received on the communications beams associated with the at least one TDOA measurement.

The method further includes determining, by the first device, if the communications beams associated with the at least one TDOA measurement converge. The determining if the communications beams associated with the at least one TDOA measurement converges is in accordance with a TRP-A.

The method further includes updating, by the first device, a TRP-A in accordance with at least one of updates to a BF-PRS configuration or the location of the second device. The first device is a location server, the second device is a receiving device, and the third device is the receiving device. The first device is a location server, the second device is a transmitting device, and the third device is a receiving device.

In accordance with an example embodiment, a receiving device configured to perform measurements and information feedback is provided. The receiving device includes one or more processors, and a computer readable storage medium storing programming for execution by the one or more processors. The programming including instructions to configure the receiving device to receive BF-PRSs on a plurality of communications beams from at least two transmitting devices in accordance with a BF-PRS configuration, make at least one OTDOA measurement in accordance with the BF-PRSs on the plurality of communications beams, and transmit OTDOA feedback including the at least one OTDOA measurement.

The programming includes instructions to configure the receiving device to one of receive the BF-PRS configuration from a single transmitting device, or receive subsets of the BF-PRS configuration from a plurality of transmitting devices. The programming includes instructions to configure the receiving device to select at least one communications beam of each transmitting device accordance with a selection criterion, identify at least one transmitting device pair from the at least two transmitting devices in accordance with the at least one communications beam of each transmitting device, wherein the at least one transmitting device pair comprises one communications beam for each transmitting device in the at least one transmitting device pair, and determine the at least one OTDOA measurement in accordance with time of arrivals associated with the communications beams of the at least one transmitting device pair.

The OTDOA feedback further includes identifiers of communications beams of the at least one transmitting device pair. The OTDOA feedback further comprises received signal strengths of the BF-PRSs received on the communications beams of the at least one transmitting device pair.

In accordance with an example embodiment, a first device adapted to perform position determination of a second device is provided. The first device includes one or more processors, and a computer readable storage medium storing programming for execution by the one or more processors. The programming including instructions to configure the first device to receive TDOA feedback from a third receiving device, the TDOA feedback includes at least one TDOA measurement, identifiers of communications beams associated with the at least one TDOA measurement, and determine a location of the second device in accordance with the TDOA feedback.

The TDOA feedback further includes received signal strengths of BF-PRSs received on the communications beams associated with the at least one TDOA measurement. The programming includes instructions to configure the first device to determine if the communications beams associated with the at least one TDOA measurement converge in accordance with a TRP-A comprising angular information of communications beams of transmitting and receiving devices and position information of third devices. The programming includes instructions to configure the first device to update a TRP-A in accordance with at least one of updates to a BF-PRS configuration or the location of the second device.

Practice of the foregoing embodiments enables a system and method for determining the position or location of a device in communications systems utilizing beamforming by overcoming difficulties associated with beamforming.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 4 illustrates an example 3GPP LTE compliant communications system, highlighting positioning support hardware and software according to example embodiments described herein;

FIG. 5A illustrates an example communications system according to example embodiments described herein;

FIG. 5B illustrates an example transmit-receive point almanac (TRP-A) according to example embodiments described herein;

FIG. 6 illustrates a flow diagram of example operations occurring in a LS participating in the determination of a position of a receiving device according to example embodiments described herein;

FIG. 7 illustrates a flow diagram of example operations occurring in a transmitting device participating in the determination of a receiving device according to example embodiments described herein;

FIG. 8 illustrates a flow diagram of example operations occurring in a receiving device participating in the determination of its position according to example embodiments described herein;

DETAILED DESCRIPTION OF ILLUSTRATIVE EMBODIMENTS

The making and using of the presently example embodiments are discussed in detail below. It should be appreciated, however, that the present disclosure provides many applicable inventive concepts that can be embodied in a wide variety of specific contexts. The specific embodiments discussed are merely illustrative of specific ways to make and use the embodiments, and do not limit the scope of the disclosure.

Figure 1:
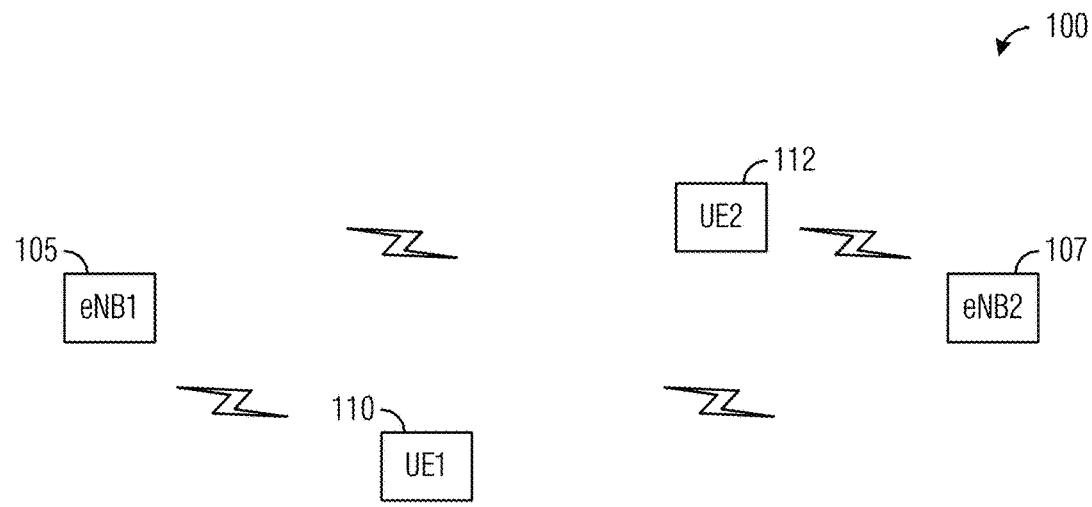
FIG. 1 illustrates an example wireless communications system according to example embodiments described herein.

FIG. 1 illustrates an example wireless communications system 100. Communications system 100 includes evolved NodeBs (eNBs), such as a first eNB (eNB1) 105 and a second eNB (eNB2) 107). The eNBs serve user equipment (UE), such as a first UE (UE1) 110 and a second UE (UE2) 112. In a cellular communications mode, communications intended for a UE or originating from a UE passes through an eNB that is serving the UE. As an illustrative example, communications intended for UE1 110 or originating from UE1 110 pass through eNB1 105. eNBs are also commonly referred to as NodeBs, next generation (NG) NodeBs (gNBs), master eNBs (MeNBs), secondary eNBs (SeNBs), master gNBs (MgNBs), secondary gNBs (SgNBs), base stations, access points, remote radio heads, and so on. Access nodes may be used as a more general term for eNBs, gNBs, NodeBs, MeNBs, SeNBs, MgNBs, SgNBs, base stations, access points, remote radio heads, and so on. Similarly, UEs are also commonly referred to as mobiles, mobile stations, stations, terminals, subscribers, users, and the like. While it is understood that communications systems may employ multiple eNBs capable of communicating with a number of UEs, only two eNBs, and two UEs are illustrated for simplicity.

An existing method for position determination of a device being located makes use of observed time difference of arrival (OTDOA) as measured by the device being located. An OTDOA measurement is a measurement of the differences between the amounts of time (i.e., time differences) that it takes for a plurality of signals to travel from transmitting devices (such as access nodes in the downlink, and UEs in the uplink) to the device being located. In the remainder of the discussion presented herein, the term transmitting device (TD) will be used to refer to a device transmitting one of the signals used to make the OTDOA measurements and the term receiving device (RD) will be used to the device being located. Therefore, in a situation wherein access nodes are transmitting signals used by UEs to make OTDOA measurements, the access nodes are the transmitting devices and the UEs are the receiving devices. Similarly, in a situation where UEs are transmitting signals used by access nodes to make OTDOA measurements, the UEs are the transmitting devices and the access nodes are the receiving devices and this case is often called uplink time difference of arrival (UTDOA). OTDOA and UTDOA may be referred to collectively as time difference of arrival (TDOA).

OTDOA based methods require a plurality of signals to be measured to obtain a positioning estimate. In a traditional cellular communications system, at least three reliable line of sight (LOS) measurements are needed to obtain a pair of time differences at the receiving device.

Figure 2:
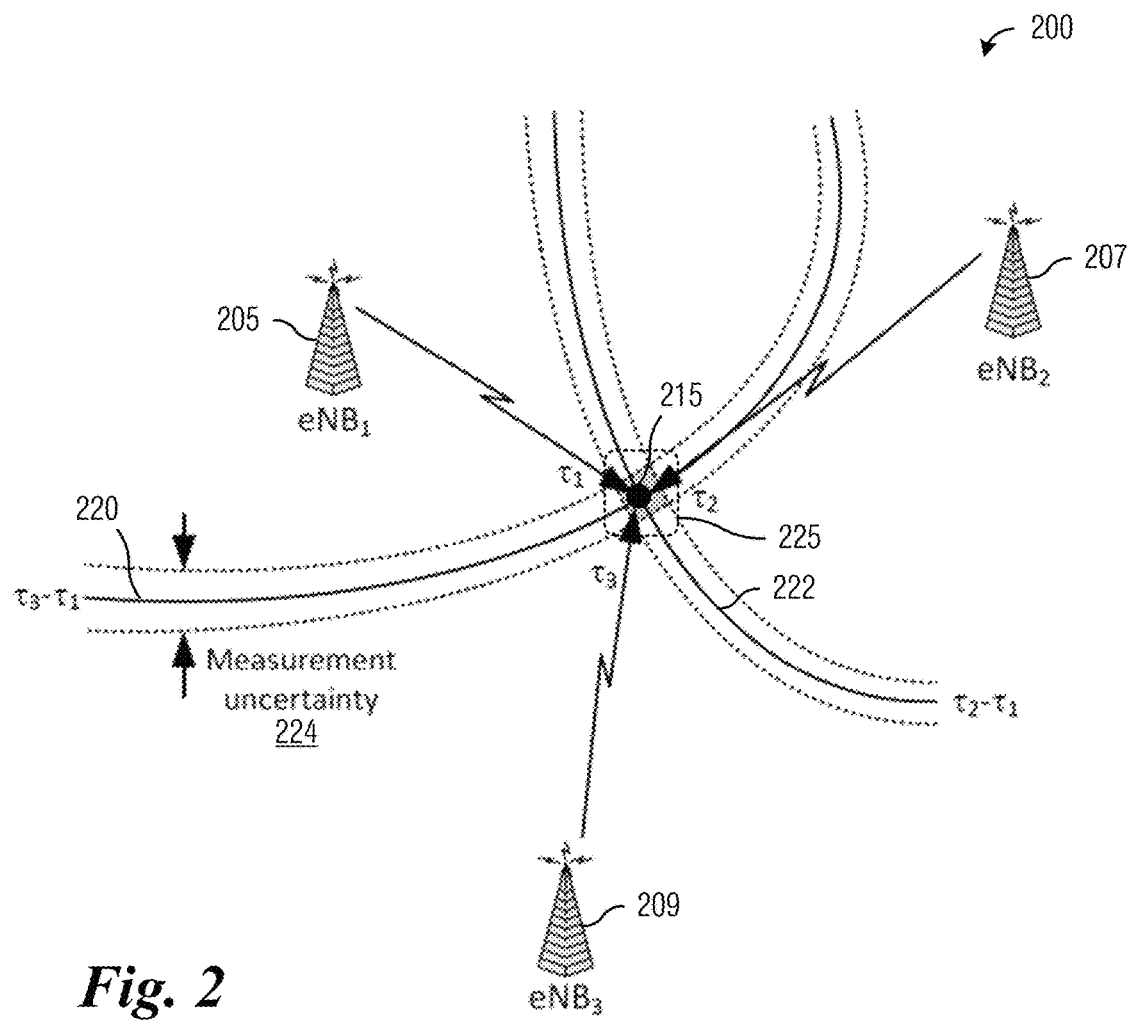
FIG. 2 illustrates an example communications system highlighting the position determination of a communications device using the prior art OTDOA based method.

FIG. 2 illustrates a communications system 200 highlighting the position determination of a communications device using the prior art OTDOA based method. Communications system 200 includes eNBs, including a first eNB (eNB1) 205, a second eNB (eNB2) 207, and a third eNB (eNB3) 209. Communications system 200 also includes a UE 215, the position of which is to be determined using the prior art OTDOA based method. The propagation times for a LOS transmission to travel from the eNBs to UE 215 are $\tau_1$ for eNB1 205, $\tau_2$ for eNB2 207, and $\tau_3$ for eNB3 209, respectively. UE 215 may not be able to measure these propagation times directly because it does not necessarily know the actual instant of transmission at the various eNBs. Rather, based on measurements of signals transmitted by the eNBs, UE 215 makes OTDOA measurements, including: the OTDOA measurement between eNB1 205 and eNB2 207, $\tau_2-\tau_1$; the OTDOA measurement between eNB2 207 and eNB3 209, $\tau_2-\tau_3$; and the OTDOA measurement between eNB3 209 and eNB1 205, $\tau_3-\tau_1$. As an illustrative example, the eNBs transmit positioning reference signals (PRSs) to assist the UEs in making the OTDOA measurements. The UEs receive the PRSs transmitted by the different eNBs and determine the respective OTDOA measurements based on the received PRSs. Therefore, in the situation presented in FIG. 2, the eNBs are the transmitting devices and the UEs are the receiving devices.

A first curve 220 represents potential locations of UE 215 based on the OTDOA measurement of $\tau_2-\tau_1$, and a second curve 222 represents potential locations of UE 215 based on the OTDOA measurement of $\tau_3-\tau_1$. A pair of dashed curves around first curve 220 represents a measurement uncertainty 224, with a similar measurement uncertainty being present for second curve 222. The measurement uncertainty may be due to factors such as synchronization error, measurement error, quantization error, multipath error, timing offset error, and so on. An intersection 225 of first curve 220 and second curve 222 represents the position of UE 215. It is noted that due to the measurement uncertainty, the exact position of UE 215 may not be known. In the two-dimensional communications system, such as communications system 200 shown in FIG. 2, measurements from at least three eNBs are needed to generate two independent OTDOA measurements (shown as first curve 220 and second curve 222) to allow for the determination of the position of a UE. In a three-dimensional communications system, measurements from at least four eNBs are needed to generate three independent OTDOA measurements to allow for the determination of the position of a UE.

Co-assigned U.S. patent application Ser. No. 15/496,381, entitled "System and Method for Collaborative Position Determination," filed Apr. 25, 2017, which is hereby incorporated herein by reference, discloses systems and methods for collaboratively determining the position of devices. The collaboration between devices helps to reduce the number of access nodes (e.g., eNBs) (both LOS and/or non-LOS (NLOS)) needed to determine the position of devices.

In communications systems that use beamforming, such as high frequency (HF) communications systems operating at 6 gigahertz (GHz) and above, including millimeter wavelength (mmWave) communications systems, to overcome high path loss, the difficulty in determining the position of devices is magnified. Due to the fact that HF (e.g., mmWave) signals between devices can easily be blocked, beam directions associated with NLOS paths may be chosen, which results in a longer observed arrival time at a receiving device, and therefore leading to potentially highly erroneous positioning results. Even if some sort of received signal strength measurement information (e.g., reference signal strength indication (RSSI), reference signal received power (RSRP), reference signal received quality (RSRQ), channel quality indicator (CQI), and so on) is provided, enabling the assessment of if a selected beam pair is LOS or NLOS, the information may be useful only if different channel measurements for different beam pair combinations for a device located at a single position are available. However, the large bandwidths available in HF communications systems results in a shorter symbol time compared to traditional communications systems operating at lower frequencies (i.e., frequencies less than 6 GHz) and therefore positioning techniques based on OTDOA can be much more precise than traditional communications systems. Therefore a scheme is needed which can overcome the blocking effect of mmWave so the increased position precision can be realized in practice.

Beamforming in HF communications systems, e.g., mmWave communications systems, may generally be performed by both the access nodes and the UEs in order to achieve commercially acceptable levels of throughput and range over the higher carrier frequencies. A communications beam may be a pre-defined set of beamforming weights in the context of codebook-based precoding or a dynamically defined set of beamforming weights in the context of non-codebook based precoding (e.g., Eigen-based beamforming (EBB)). It should be appreciated that a UE may rely on codebook-based precoding to transmit uplink signals and receive downlink signals, while an access node may rely on non-codebook based precoding to form certain radiation patterns to transmit downlink signals and/or receive uplink signals.

Figure 3:
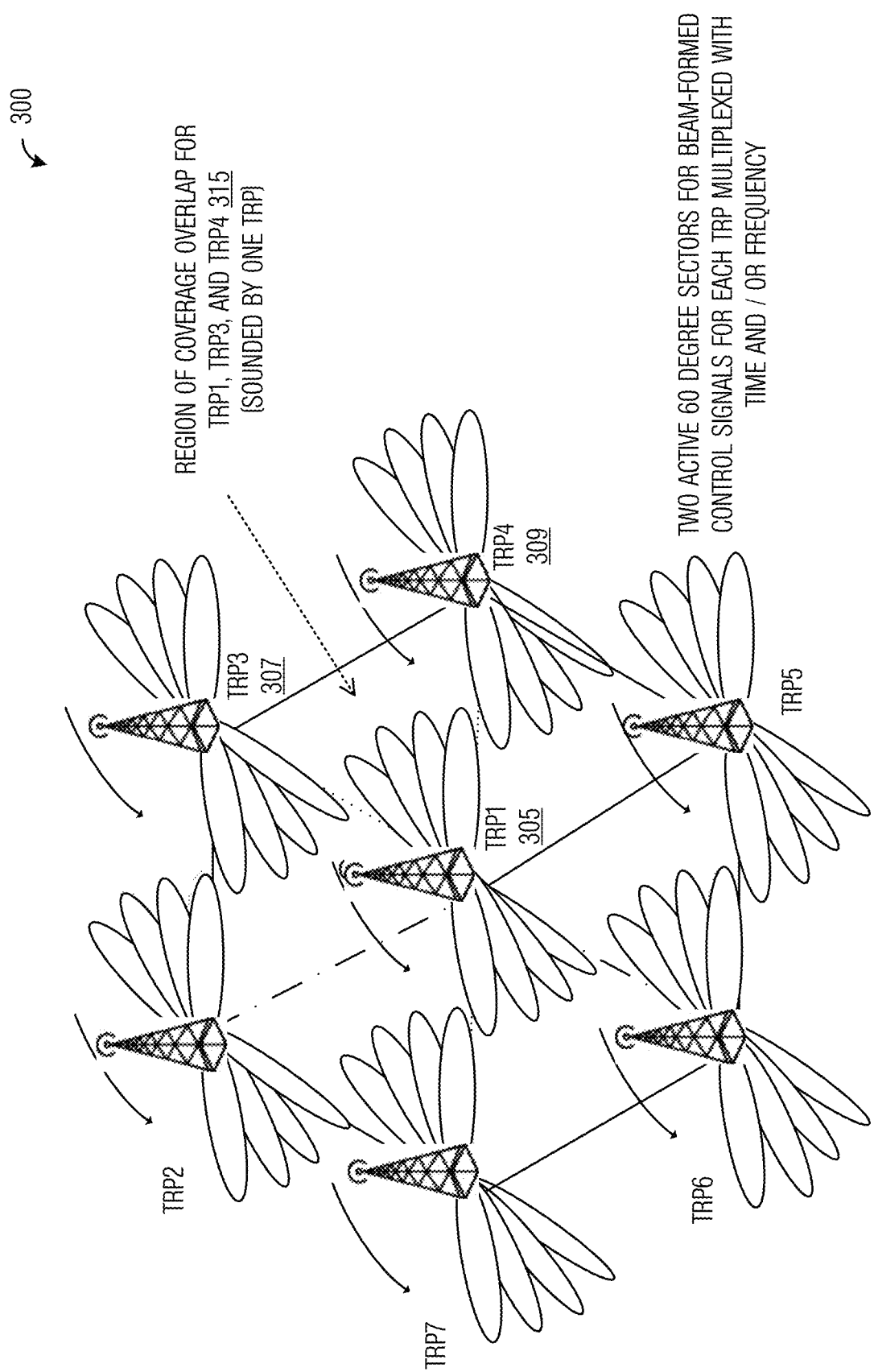
FIG. 3 illustrates a communications system supporting beamformed communications according to example embodiments described herein.

FIG. 3 illustrates a communications system 300 supporting beamformed communications. Communications system 300 includes a plurality of transmit-receive points (TRPs), such as TRP1 305, TRP3 307, and TRP4 309. TRPs may be network side devices, such as access nodes. However, in some situations, TRPs may also be implemented using UEs. Each TRP communicates using a set of communications beams. If transmit beamforming is supported by the TRP, the TRP transmits using a set of transmit beams, while if receive beamforming is supported, the TRP receives using a set of receive beams. While, if both transmit and receive beamforming is supported, the TRP transmits using a set of transmit beams and receives using a set of receive beams.

As shown in FIG. 3, the TRPs of communications system 300 can be coordinated to transmit beamformed signals in order to reduce interference to UEs that are in overlapping coverage areas. Co-assigned US patent application publication 2017/0033904A1 filed Jul. 31, 2015, entitled "System and Method for Transmitting Beamformed Reference/Control Signals", which is hereby incorporated herein by reference, provides techniques for transmitting beamformed reference and/or control signals. As an example, TRP1 305 and TRP4 309 coordinate so that TRP1 305 is not transmitting to an overlapping coverage area in the same time frequency resources as TRP4 309. Therefore a UE located in the coverage area receives clean signals (free of interference) from TRP 1 305 and TRP 4 309. As another example, in a region of coverage overlap, such as region 315 that is a region of coverage overlap of TRP1 305, TRP3 307, and TRP4 309. Within a region of coverage overlap (e.g., region 315), a single TRP transmits (sounds) a signal used for reference purposes in any given set of time frequency resources. While in an area comprising two active sectors (e.g., 60 degree sectors, but other dimensionalities are possible) beamformed control signals for each TRP may be multiplexed in time and/or frequency. Other schemes are possible.

According to an example embodiment, in a communications system utilizing beamforming, the transmitting devices (i.e., TRPs in the downlink and UEs in the uplink) transmit beamformed positioning reference signals (BF-PRSs) to allow the receiving devices (e.g., UEs in the downlink and TRPs in the uplink) to make TDOA measurements in accordance with the BF-PRSs. The transmitting devices may transmit the BF-PRSs using transmit beams and the receiving devices may receive the BF-PRSs using receive beams. A combination of the beamforming gain and transmission power provides sufficient link budget to allow receiving devices close to neighboring transmitting devices (e.g., transmitting devices other than a transmitting device(s) serving the receiving device) to receive the BF-PRSs transmitted by the neighboring transmitting devices. The BF-PRSs may be transmitted on dedicated time/frequency resources (which can easily be implemented due to the large amount of available bandwidth in HF) or they may be transmitted using data blanking where resources normally allocated for the transmission of data would be blanked so that the resources may be used for BF-PRS transmission.

According to an example embodiment, each BF-PRS has a separate beam identifier so that the receiving device can identify the best beam directions from each TRP or UE. Depending upon the organization of the transmitting devices in the HF communications system, the transmitting devices may or may not be distinguishable. If the transmitting devices are indistinguishable, the communications system will have a much larger set of beam identifiers and the receiving device may make the TDOA measurements in accordance with the best received beams.

In a situation where the beams from different transmitting devices are not be able to be received within the same symbol time (this arises depending on how the transmissions from different transmitting devices are multiplexed), the receiving device may measure the time offset between the received beams from different transmitting devices and the symbol boundary. Therefore, when the beams from different transmitting devices are transmitted in different symbols, the difference in transmission times from the transmitting devices may be compensated for in the TDOA measurement. As an example, a modulo operation may be applied to the transmission time to eliminate time differences of the transmissions of the beams in different symbol times.

The configuration of the BF-PRS for the transmitting devices may be configured in a static, semi-static, or dynamic manner. A static configuration of the BF-PRS may be a long-term configuration of the BF-PRS. As an illustrative example, the BF-PRS configuration is specified in a technical standard, by an operator of the communications, due to a collaboration between a server responsible for providing positioning services (such as a location server (LS)), the transmitting devices, and/or the receiving devices during initial setup, and so on. A semi-static configuration of the BF-PRS may be an intermediate-term configuration of the BF-PRS and may make use of information related to the communications and/or the devices, but the information is slow changing information. A dynamic configuration may be a short-term configuration of the BF-PRS and may make use of quickly changing information (such as receiving device mobility, failures, blockages, obstacles, and so on) to configure the BF-PRS. The configuration of the BF-PRS may be signaled to the receiving device using a communications protocol (such as a 3GPP LTE positioning protocol (LPP)).

A transmitting device or some network entity may signal the configuration of the BF-PRS to the receiving device. Alternatively or in addition, a secure user plane (SUPL) protocol may be used. For example, a SUPL protocol may provide user plane transport for messages of an LPP protocol. The signals may be provided to the transmitting devices from a network entity using a 3GPP LTE LPP A (LPPa), for example. Alternatively, the signals may be generated by a network entity, e.g., a LS, based on configuration information delivered to the network entity from one or more transmitting devices using LPPa.

Alternatively, if the BF-PRS is assisted, partially replaced, or fully replaced by another beamformed reference signal (such as a beamformed channel state information reference signal (CSI-RS), for example), the configuration of the beamformed PRS of the HF transmitting devices may be optionally signaled by a broadcast channel, e.g., a physical broadcast control channel (P-BCH) or a logical broadcast control channel (BCCH), of a gNB (or eNB (in a dual connectivity (DUCO) deployment)) that serves the HF TRPs.

FIG. 4 illustrates an example 3GPP LTE compliant communications system 400, highlighting positioning support hardware and software. Communications system 400 includes a UE 405 that is served by an eNB 407. eNB 407 is coupled to a location services (LCS) server 409 by way of a serving gateway (S-GW) 411 and a packet gateway 413, as well as a mobility management entity 415. LCS server 409 includes a SUPL location platform (SLP) function 417 and an evolved serving mobile location center (E-SMLC) function 419. It should be appreciated that some deployments may include only an SLP function or an E-SMLC function while other deployments may include both. LCS server 409 is coupled to a gateway/mobile location center (GMLC) 421 and an LCS client 423.

According to an example embodiment, angular information and position information of devices transmitting BF-PRSs are used to help improve positioning performance. The angular information and the position information may help to improve positioning performance by assisting in the classification of signal paths as being LOS or NLOS. As an illustrative example, a receiving device can determine if a communications beam associated with a received BF-PRS corresponds to a LOS path by using the position information associated with the more than one transmitting devices and angular information associated with the best communications beams from those transmitting devices. If the best communication beams from the more than one transmitting devices align, the receiving device may determine that the communications beam associated with the received BF-PRS corresponds to a LOS path. As another illustrative example, a location server or a transmitting device that has received multiple TDOA measurements from receiving devices can make use of the angular information and the position information of the transmitting devices to determine if the communications beam indices associated with the TDOA measurements converge on the TDOA measurement curve or surface. If the communications beam indices converge, then the communications beam indices are LOS paths, while if they do not converge, then the communications beam indices are NLOS paths. A detailed discussion of the use of the angular information and the position information to classify a path is provided below.

According to an example embodiment, the angular information of the BF-PRSs of the communications beams and the position information of the transmitting devices transmitting BF-PRSs are stored in a database or server, referred to herein as a transmit-receive point almanac (TRP-A) (or more traditionally known as the base station almanac (BSA) or a transmitting device almanac (TDA)). Angular information (relative to a reference direction, such as magnetic north, north, south, east, west, or any other agreed upon reference angle or direction) associated with the individual communications beams (identified by beam identifier, for example) of each transmitting device are stored in the TRP-A. The TRP-A may be stored at a LS, which may be coupled to the transmitting devices by an interface or a plurality of interfaces, such as the combination of Si and SLS interfaces used in 3GPP LTE. Alternatively, the TRP-A may be stored at some or all of the transmitting devices of the communications system. The TRP-A may also include position information (such as global positioning system (GPS) derived position information or operator provided position information) of each of the transmitting devices. The angular information effectively comprises angle of departures (AoDs) or similarly, angle of arrivals (AoAs), of the communications beams of each transmitting device referenced to an angle or direction.

FIG. 5A illustrates an example communications system 500. Communications system 500 includes a plurality of TRPs, including TRP1 505, TRPU 507, TRPZ 509, TRPY 511, and TRPX 513. Communications system 500 also includes a TRP-A 515. TRP-A 515 may be included in a LS. Alternatively, TRP-As 515 may be part of a remote database. In yet another alternative, TRP-As 515 may be stored at some or all of the TRPs (e.g., transmitting devices) of communications system 500. As shown in FIG. 5A, TRP-A 515 is coupled to the plurality of TRPs.

As discussed previously, TRP-A 515 includes angular information of communications beams of devices transmitting BF-PRSs, as well as position information of the devices. As an illustrative example, consider the communications beams of TRP1 505, which include communications beam ID1 520, communications beam ID2 522, communications beam IDN 524, and others. Angular information for communications beam ID1 520 may include angle α1, communications beam ID2 522 may include angle α2, and communications beam IDN 524 may include angle αN, all of which are referenced to a reference angle or direction (such as magnetic north). Position information of the transmitting devices may include location information of the transmitting devices derived from GPS measurements, for example. Alternatively, in a situation wherein the transmitting devices are not mobile, the position information may include location information of the transmitting devices entered during network deployment or when the transmitting devices were installed.

It is noted that the scenario illustrated in FIG. 5A shows TRPs as transmitting devices. In a scenario where UEs are transmitting devices, the UEs may also have access to a TRP-A, which may have angular information and position information of the UEs stored therein. Therefore, the discussion of transmitting devices being TRPs should not be construed as being limiting to the scope or the spirit of the example embodiments.

FIG. 5B illustrates an example TRP-A 550. TRP-A 550 may be an example of TRP-A 515. As shown in FIG. 5B, TRP-A 550 is represented in tabular form, although other representations are possible. TRP-A 550 includes identifier information 555, position information 557, and angular information 559 for the transmitting devices. As shown in FIG. 5B, identifier information 555 includes TRP identifier and/or UE identifier in the case when UEs are transmitting devices. Identifier information 555 may be used to associate position information 557 and angular information 559 with specific transmitting devices. Position information 557 may include X and Y axis (or, alternatively, latitude and longitude) information for the TRPs and/or UEs, and angular information 559 comprising an angle for each of a plurality of communications beams of the TRP and/or the UE useable for transmitting BF-PRSs. In other words, angular information 559 may include angles of communications beams used for transmitting the BF-PRSs, while excluding angles of communications beams not used for transmitting the BF-PRSs. Therefore, angular information 559 may include angles corresponding to a subset of all communications beams available to the TRP and/or UE. It is also noted that different devices may have different number of angles, depending on the number of communications beams supported by each device.

It is noted that in a situation where the transmitting devices (e.g., TRPs as shown in FIG. 5A) transmitting the BF-PRSs are indistinguishable by separate TRP identifiers (i.e., the receiving device does not know the identifier information 555 of the devices transmitting the BF-PRSs), the beam identifiers for each device transmitting the BF-PRSs may then need to be unique (or locally unique) for each of the transmitting devices in the TRP-A. Locally unique beam identifiers are beam identifiers are unique within an area or region of a communications system where a receiving device is expected to be able to detect signals of transmissions from a transmitting device or transmitting devices on communications beams associated with the beam identifiers. However, locally unique beam identifiers are not unique in the entirety of the communications system.

The information in the TRP-A (e.g., the angular information and/or the position information) may be set statically, semi-statically, or dynamically. Updates to the information in the TRP-A may be communicated to the LS (or some other entity or entities maintaining the TRP-A). As an illustrative example, if a network architecture such as one presented in FIG. 4 is used, signaling of the updates to the TRP-A may make use of the LPPa protocol over the Si and SLs interfaces. Semi-static and dynamic updates to the information in the TRP-A, which may include angular information to beam identifier mappings, may be useful in situations where temporary or mobile transmission devices are use or if the BF-PRSs are transmitted in a reconfigurable manner, such as situations where the BF-PRSs are transmitted in multiple steps, if the beam-widths change, and so on.

FIG. 6 illustrates a flow diagram of example operations 600 occurring in a LS participating in the determination of a position of a device. Operations 600 may be indicative of operations occurring in a LS as the LS participates in the determination of the position of a device. In the situation where the BF-PRSs are transmitted in the downlink by TRPs, the device being positioned is a UE, while in the situation where the BF-PRSs are transmitted in the uplink by UEs, the device being positioned is also a UE.

Operations 600 at the LS or other entity determining the position of the device begin with receiving TDOA feedback (block 605). The TDOA feedback may be received from receiving devices. The TDOA feedback includes TDOA measurements and may further include the signal strength information. The TDOA measurements are associated with the communications beams of a pair of transmitting devices. Each TDOA measurement is associated with a first communications beam from a first transmitting device and a second communications beam from a second transmitting device. The first communications beam and the second communications beam may be the best communications beam from each of the two transmitting devices. In an alternative embodiment, the LS receives a plurality of TDOA measurements, some may be associated with the best communications beams of a pair of transmitting devices, and some may be associated with other communications beams of a pair of transmitting devices that are not the best communications beams. The signal strength information may indicate the received signal strength (such as the CQI, RSSI, RSRQ, RSRP, and so on) of the BF-PRSs received by the receiving devices. It is noted that in situations where the LS receives TDOA measurements associated with multiple pairs of transmitting devices, as well as for multiple communications beams per transmitting device, the overall determined position of the receiving devices may be improved.

The LS may perform a check to determine if communications beams associated with the TDOA measurements converge (block 607). The LS may check to determine if communications beams associated with the TDOA measurements converge. In other words, the LS may check to determine if the paths associated with the TDOA measurements are LOS or NLOS paths. A detailed discussion of the determination if communications beams converge is provided below. If the communications beams associated with the TDOA measurements do not converge, the LS may elect to terminate operations 600. In this case the LS may indicate a failure of the positioning determination attempt.

If one or more of the communications beams associated with the TDOA measurements do converge, the LS determines the location of each one of the devices in accordance with the TDOA measurements (block 609). As an illustrative example, the LS evaluates the communications beams associated with a TDOA measurement with respect to information included in the TRP-A and determines where the communications beams converge on a curve or surface associated with the TDOA measurement. A region on the curve or surface where the communications beams converge corresponds to the case that the chosen beams and associated delays are from LOS directions and therefore the difference times are correct and the point of intersection of the curve is the location of the device. It is noted that there is a degree of uncertainty in the location of the device, due to factors such as inaccuracies in the TDOA measurements, beam-widths of the communications beams, and so on. Therefore, if the receiving device is able to report multiple TDOA measurements, the degree of uncertainty may be reduced. As an example, the LS determines multiple regions on the curve or surface based on each of multiple TDOA measurements, and the LS is able to reduce the uncertainty by determining an intersection of the multiple regions on the curve or surface, thereby improving the position determination.

Independent of TDOA feedback configurations, the LS may search through the communications beam combinations to determine a position of the device in accordance with the information stored in the TRP-A for each of the transmitting devices. The TDOA feedback may be searched in accordance with the signal strengths to help reduce search complexity and/or time. Alternatively, the TDOA feedback may be searched in accordance with indications of measurement quality provided by the receiving devices. Due to the high pathloss of HF signals, signal strength tends to drop quickly in NLOS situations, and searching the TDOAs from different beams in the order of the measured and reported respective signal strengths order may help to reduce the number of beam convergence tests and location determinations before the position of the device has been determined.

The LS may share the position of the device with other devices in the communications system (block 611). As an illustrative example, the LS may share the position of the device with other network entities in the communications system, which could include the device itself. As a further illustrative example, the LS may share the position of the device with a client of an LCS operation.

FIG. 7 illustrates a flow diagram of example operations 700 occurring in a transmitting device participating in the determination of a position of a device. Operations 700 may be indicative of operations occurring in a transmitting device as the transmitting device participates in the determination of the position of a device.

Operations 700 begin with the transmitting device transmitting a BF-PRS configuration (block 705). The BF-PRS configuration may be transmitted to individual receiving devices. Alternatively, the BF-PRS configuration may be broadcast to receiving devices operating within coverage of the transmitting device. The BF-PRS configuration may include information to help receiving devices receive the BF-PRS transmitted by the transmitting device. The BF-PRS configuration may include: communications beam configuration of the transmitting device, network resources used by the transmitting device to transmit the BF-PRS, encoding (if any) used to transmit the BF-PRS, and so on. The transmitting device may also transmit a BF-PRS configuration containing similar information for one or more nearby transmitting devices. The transmitting device may also provide additional information, such as positioning options (e.g., those required for A-GPS), and so on. The transmitting device transmits the BF-PRS (block 707). The transmitting device transmits the BF-PRS in accordance with the BF-PRS configuration. The transmitting device may optionally receive the location of the receiving device(s) (block 709). The transmitting device receives the location of the receiving device(s) as determined by the LS. The transmitting device may forward the location of the receiving device(s) to the receiving device, for example.

FIG. 8 illustrates a flow diagram of example operations 800 occurring in a receiving device participating in the determination of a position of a device. Operations 800 may be indicative of operations occurring in a receiving device as the receiving device participates in the determination of a position of a device.

Operations 800 begin with the receiving device receiving a BF-PRS configuration (block 805). The BF-PRS configuration may be received from a transmitting device transmitting the BF-PRS. The BF-PRS configuration may be specifically addressed to the receiving device. Alternatively, the BF-PRS configuration may be broadcast to receiving devices operating within coverage of the transmitting device. The receiving device may receive a BF-PRS configuration from each transmitting device that it is capable of receiving BF-PRSs from. Alternatively, the receiving device may receive a single BF-PRS configuration from a single transmitting device that includes BF-PRS configuration information from nearby transmitting devices which a receiving device operating in coverage of the transmitting device may be capable of receiving BF-PRSs from. The BF-PRS configuration may include: communications beam configuration of the transmitting device, network resources used by the transmitting device to transmit the BF-PRS, encoding (if any) used to transmit the BF-PRS, and so on. The transmitting device may also provide additional information, such as positioning options. The receiving device receives BF-PRS in accordance with the BF-PRS configuration (block 807).

The receiving device selects the best beams of the transmitting devices and transmitting device pairs (block 809). In an embodiment, the receiving device selects a beam of each transmitting device that is associated with a BF-PRS that meets a selection criterion as a best beam of the transmitting device. The selection criterion may be specified by a technical standard, determined by an operator of the communications system, determined in collaboration between transmitting device and receiving device, determined in accordance with performance history, and so on. As an illustrative example, the receiving device receives BF-PRSs on two transmission beams from a single transmitting device, the receiving device selects the transmission beam associated with the BF-PRS with greater received signal strength as the best beam. In another embodiment, the receiving device selects multiple beams of each transmitting device that are associated with BF-PRSs that meet a selection criterion as best beams of the transmitting device, if available. As an illustrative example, the receiving device receives BF-PRSs on three transmission beams from a single transmitting device, the receiving device selects j transmission beams associated with the BF-PRS with j highest received signal strengths as the best beams, where j is an integer value. Alternatively, the receiving device selects j transmission beams out of the transmission beams associated with BF-PRSs that exceed a selection criterion. The receiving device also selects transmitting device pairs. The selection of the transmitting device pairs may be in accordance with the selected best beams. As an illustrative example, the receiving device pairs up transmitting devices from transmitting devices associated with the best beams that the receiving device selected. The receiving device makes TDOA measurements (block 811). As an example, a TDOA measurement between a transmitting device pair of TD1 and TD2 is expressible as $$TDOA\_TD1\_TD2 = Time\_TD1 - Time\_TD2,$$

where Time_TDN is the time of arrival for transmitting device N at the receiving device.

The receiving device transmits the TDOA feedback (block 813). The TDOA feedback includes OTDOA measurements for the best communications beams. In another embodiment, the TDOA feedback includes all available TDOA measurements. The TDOA feedback includes the TDOA measurements, communications beams associated with each transmitting device pair, and may include signal strength measurements. As an example, the TDOA feedback may include:

TDOA1=T1 {between indicated communications beams of TDX and TDY);

TDOA2=T2 {between indicated communications beams of TDX and TDZ);

BeamXi=BXi;

BeamYi=BYi;

BeamZi=BZi;

SignalStrengthXi=RXi;

SignalStrengthYi=RYi;

SignalStrengthZi=RZi;

Where TN is the N-th TDOA measurement associated with indicated communications beams of a transmitting device pair, TDK is the K-th transmitting device, BKi is the i-th communications beam of TDK, RKi is the received signal strength (e.g., CQI, RSSI, RSRQ, RSRP, etc.) of the i-th communications beam of TDK. Other configurations and arrangements of the TDOA feedback are possible. The examples presented herein are intended for discussion purposes only.

In order to improve the estimated position of the device or to improve the probability of finding an estimated position of the device, the receiving device may be configured to feedback more than one TDOA measurement per transmitting device pair. The receiving device may also feedback corresponding communications beam indices and signal strengths for each TDOA measurement. The number of TDOA measurements may be limited to a maximum number to restrict the amount of feedback. The receiving device may be configured to provide the feedback of more than one TDOA measurements (e.g., up to L TDOA measurements) for the strongest transmitting device pairs (that meet a threshold, for example) or for a specified number of transmitting device pairs (e.g., 1). The amount of TDOA feedback provided by the receiving device is then expressible as L*M TDOA measurements with corresponding pairs of communications beams and signal strength measurements, where L is the number of TDOA measurements per transmitting device pair and M is the number of transmitting device pairs.

Alternatively, the receiving device may be configured to feedback up to NTDOA measurements from different transmitting device pairs and for each transmitting device pair, the receiving device feeds back at least one communications beam pair (e.g., the best communications beam pair) and at least one signal strength measurement.

Figure 9A:
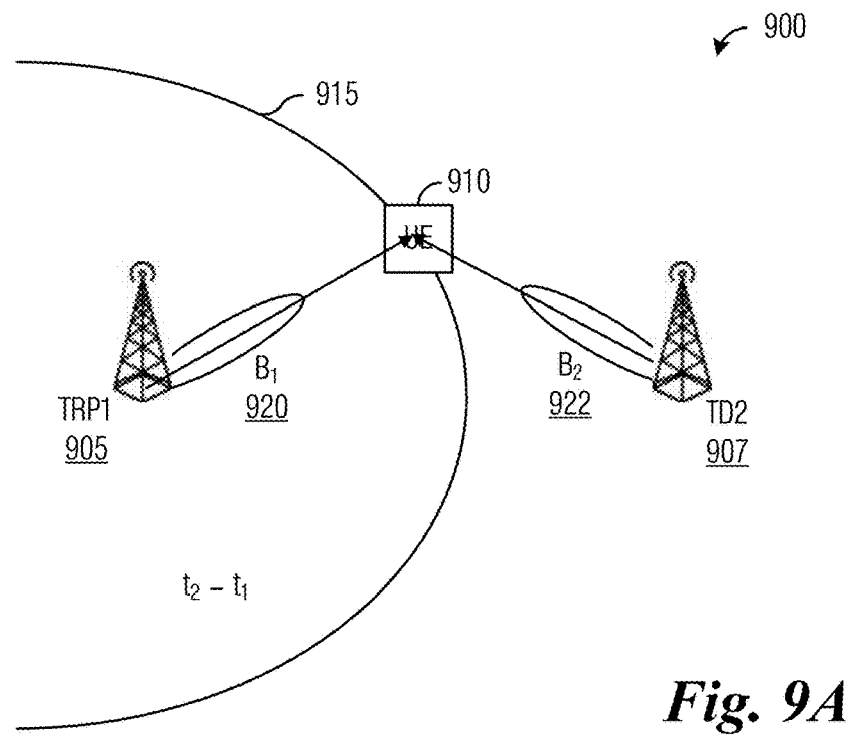
FIG. 9A illustrates an example communications system highlighting a situation where communications beams associated with an OTDOA measurements converge according to example embodiments described herein.

FIG. 9A illustrates an example communications system 900 highlighting a situation where communications beams associated with a TDOA measurements converge. Communications system 900 includes a first TRP (TRP1) 905, a second TRP (TRP2) 907, and a UE 910. As shown in FIG. 9A, UE 910 makes a TDOA measurement based on signals transmitted by TRP1 905 and TRP2 907. A curve 915 represents potential locations of UE 910 based on the TDOA measurement. The TDOA measurement is based on signals transmitted by TRP1 905 on beam B1 920 and TRP2 907 on beam B2 922. Utilizing the angular information and the position information stored in a TRP-A, it is possible to determine that the two beams (B1 920 and B2 922) converge to a common region, indicating that the communications beams associated with the OTDOA measurement converges. The TDOA measurement can then be associated with a LOS path.

Figure 9B:
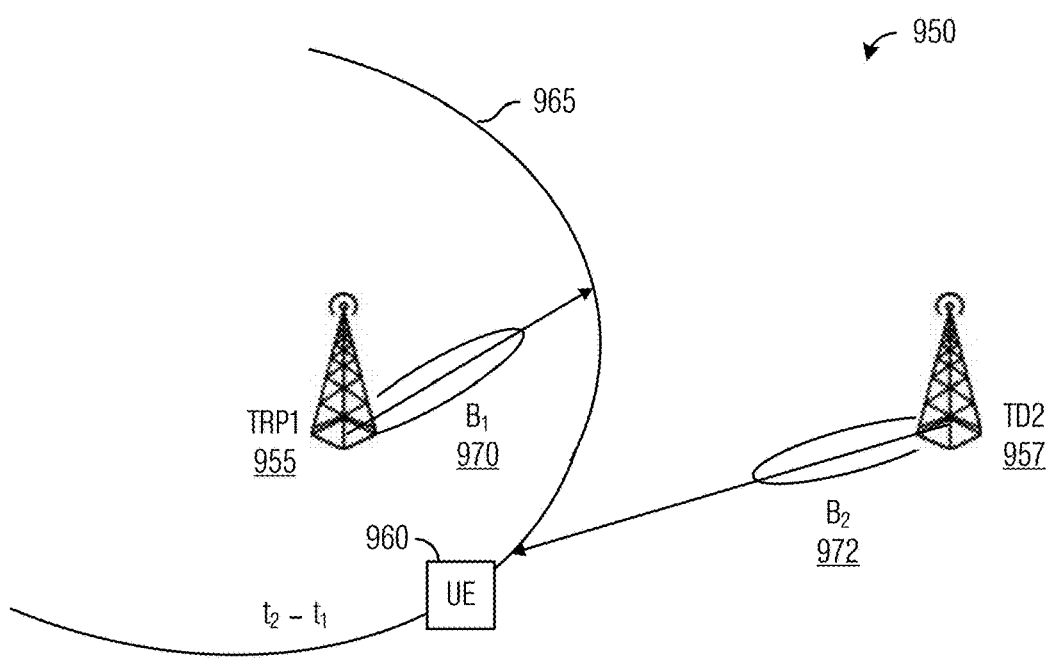
FIG. 9B illustrates an example communications system highlighting a situation where communications beams associated with an OTDOA measurements do not converge according to example embodiments described herein.

FIG. 9B illustrates an example communications system 950 highlighting a situation where communications beams associated with a TDOA measurements do not converge. Communications system 900 includes a first TRP (TRP1) 955, a second TRP (TRP2) 957, and a UE 960. As shown in FIG. 9B, UE 960 makes a TDOA measurement based on signals transmitted by TRP1 955 and TRP2 957. A curve 965 represents potential locations of UE 960 based on the TDOA measurement. The TDOA measurement is based on signals transmitted by TRP1 955 on beam B1 970 and TRP2 957 on beam B2 972. Utilizing the angular information and the position information stored in a TRP-A, it is possible to determine that the two beams (B1 920 and B2 922) do not converge to a common region, indicating that at least one of the communications beams associated with the TDOA measurement is associated with a NLOS path. It is noted that the availability of TDOA measurements for signals transmitted on multiple communications beams of a single transmitting device can help to increase the probability of finding TDOA measurements associated with LOS paths.

According to an example embodiment, the overlap in communications beam coverage areas are used as a criterion for determining if communications beams associated with a TDOA measurement are LOS or NLOS. How much the coverage areas of the communications beams overlap (or correspondingly, how far apart the coverage areas are) on a curve (or surface) of potential receiving device locations may be used to help determine if the communications beams are LOS or NLOS. The communications beams coverage areas may be calculated by a network entity using knowledge of the beam-widths of the communications beams and the distance between the transmitting devices and the curve (or surface).

Figure 10:
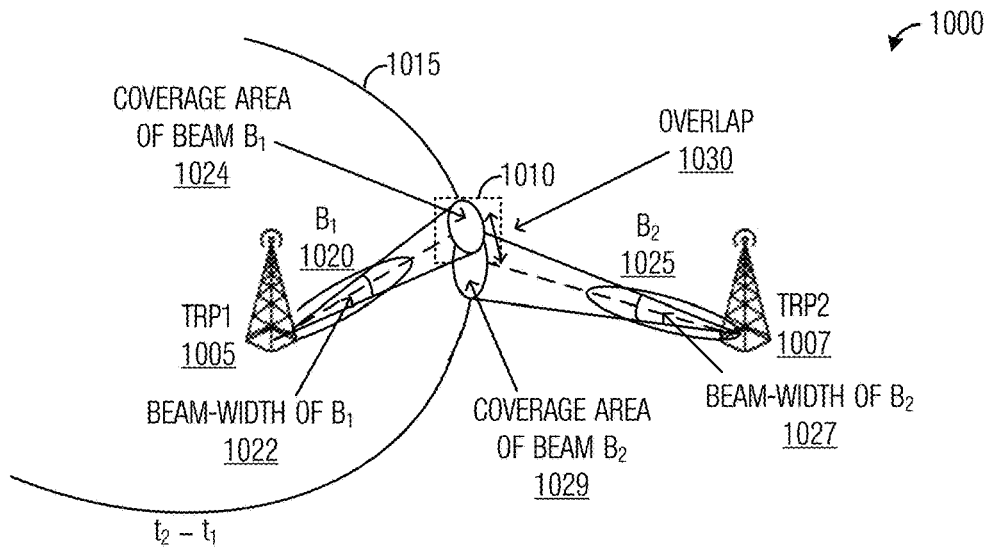
FIG. 10 illustrates an example communications system highlighting the use of communications beam coverage areas in determining if the communications beams are LOS or NLOS according to example embodiments described herein.

FIG. 10 illustrates an example communications system 1000 highlighting the use of communications beam coverage areas in determining if the communications beams are LOS or NLOS. Communications system 1000 includes a first TRP (TRP1) 1005, a second TRP (TRP2) 1007, and a UE 1010. A curve 1015 represents potential locations of UE 1010 based on the TDOA measurement. The TDOA measurement is based on signals transmitted by TRP1 1005 on beam B1 1020 and TRP2 1007 on beam B2 1025. Beam B1 1020 has an associated beam-width 1022 and coverage area 1024, while beam B2 1025 has an associated beam-width 1027 and coverage area 1029. On curve 1015, the coverage areas of beams B1 1020 and B2 1025 have an overlap 1030. In general, the greater the overlap, the greater the probability that the communications beams are LOS. As an example, if there is no overlap, then the probability is high that the communications beams are NLOS.

In a situation when a receiving device is not able to distinguish the different transmission devices and can just receive different BF-PRS beams the configuration for the receiving device specified by the network can assist the receiving device by setting:

A minimum time difference (a minimum TDOA measurement) between chosen communications beam pairs, and A minimum communications beam index difference between chosen communications beam pairs.

The setting of the minimum time difference and the minimum beam index difference may help to ensure that the communications beams selected by the receiving device are associated with different transmitting devices.

The example embodiments presented herein may be implemented in a HF communications system where the BF-PRSs may be transmitted at a configured set rate or the BF-PRSs may be configured to be transmitted as required or on demand, thereby reducing the overhead of transmitting the BF-PRSs continually. Alternatively, the example embodiments presented herein may be integrated in a legacy communications system (such as a 3GPP LTE compliant communications system), and the BF-PRSs may be transmitted at a configured set rate or the BF-PRSs may be configured to be transmitted as required or on demand to improve positioning performance (beyond what is supported in the legacy communications system) for a set of HF transmitting devices serving a particular area of the legacy communications system.

The discussion of the example embodiments presented herein has focused on downlink (transmissions from a TRP (transmitting device) to a UE (receiving device)) BF-PRSs. However, the example embodiments are also operable in the uplink with transmissions from a UE (transmitting device) to TRPs (receiving device). In the uplink, the receiving devices may use UTDOA measurements from the transmitting devices and received AoAs at each receiving device to determine if the UTDOA measurements from chosen communications beam directions are LOS or NLOS. It is noted that UTDOA measurements are similar to OTDOA measurements except that they occur in the uplink, with the time difference determined by the relative time of arrival of a single uplink transmission at two or more different receiving devices.

For the case the signals are received in the uplink directions, signaling between the receiving devices (the receiving TRPs) and the LS may occur as follows:
1. The received AoA at each receiving device may be explicitly signaled (using LPPa to an E-SMLC at the LS, for example); or
2. The receiving device may report the receive communications beam index to the E-SMLC and the AoA may be determined using a receive communications beam to AoA angle mapping stored in the TRP-A. It is noted that the received communications beam to AoA angle mapping may be different from the BF-PRS to AoD mapping shown in FIG. 5B and discussed herein.

Figure 11A:
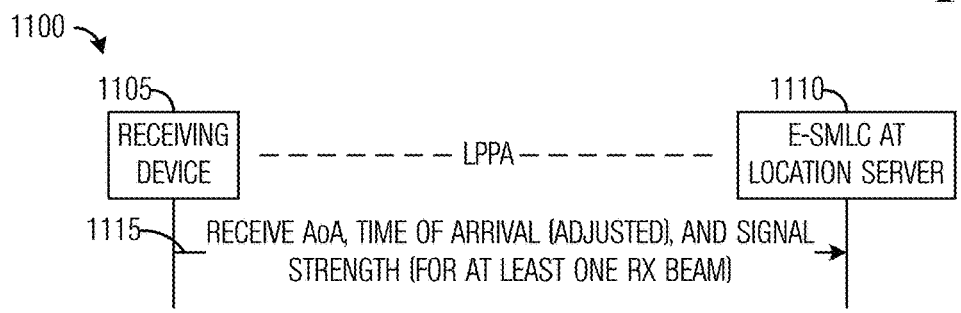
FIGS. 11A-11C illustrate examples of signaling of the mapping of receive communications beam to angles according to example embodiments described herein.
Figure 11B:
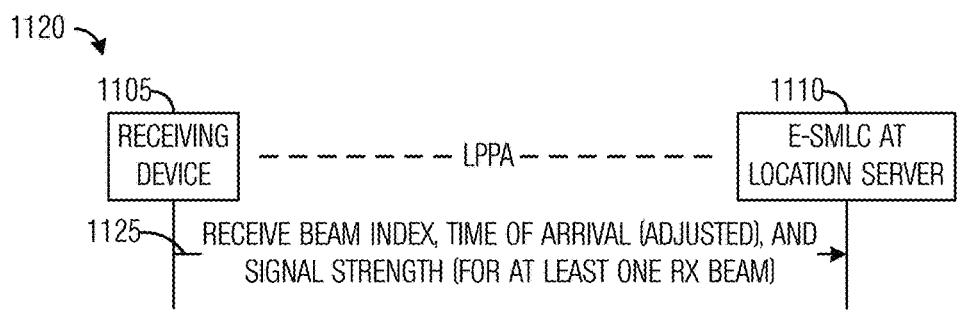
Figure 11C:
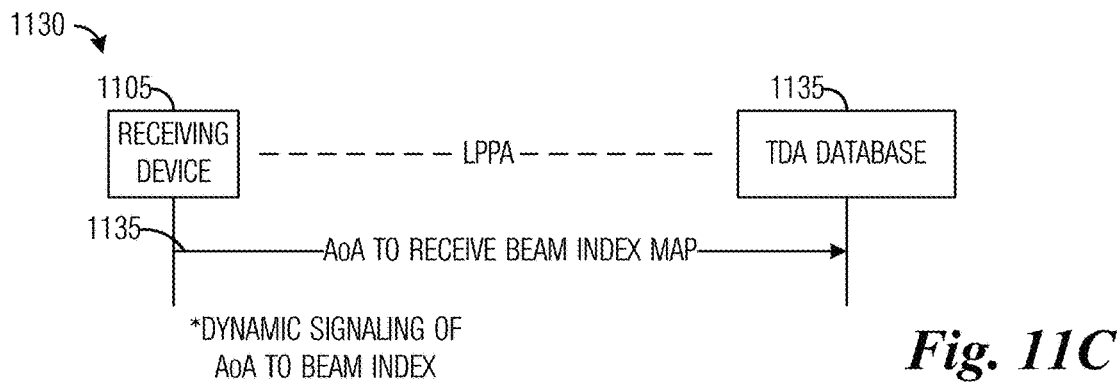

FIGS. 11A-11C illustrate examples of signaling of the mapping of receive communications beam to angles. In a first example 1100 shown in FIG. 11A, a receiving device 1105 (such as a receiving TRP) signals to an E-SMLC 1110 at a LS, a received AoA, an adjusted time of arrival, and signal strength for at least one receive communications beam (event 1115). In a second example 1120 shown in FIG. 11B, receiving device 1105 signals to E-SMLC, a receive beam index, an adjusted time of arrival, and signal strength for at least one receive communications beam (event 1125). In a third example 1130 shown in FIG. 11C, receiving device 1105 signals to a TRP-A database 1135 maintaining the TRP-A, an AoA to receive communications beam index map (event 1135). Third example 1130 may be an example of dynamic signaling of AoA to beam index mapping.

In a HF communications system (e.g., such as a mmWave communications system), it is highly likely that the UEs (when operating as transmitting devices) will also utilize beamforming and therefore may not be able to simultaneously transmit in all directions. Therefore, the timing of the beamformed transmissions from the UEs (along with the respective beam-widths) may need to be known or configured to enable the determination of the UTDOA measurements at the LS.

For the downlink case (TRPs transmitting BF-PRS to UEs), it is noted that the angular resolution needed for communications beam selection may be dependent upon a number of transmitting devices that can be received at the receiving device. As an example, consider a situation where a receiving device can receive signals from three transmitting devices, the angular resolution required for communications beam selection may not be critical because the communications beam index (which is related to AoD from the transmitting device) together with the OTDOA measurements may provide enough information to confirm if the intersecting curves related to the OTDOA measurements are from LOS beams or not. As an example, consider a situation where a receiving device can receive signals from two transmitting devices, there is then only one curve related to OTDOA measurements and therefore the angular resolution of the communications beams is more critical. In this situation, methods to improve the angular resolution of the communications beams may be useful in improving performance. Examples of these methods include:
 a. Multi-step beam refinement; and
 b. Feedback based, such as receiving device providing feedback of multiple adjacent communications from one transmitting device (along with signal strength reports) and using linear interpolation between adjacent communications beams based on signal strength to obtain more precise angular resolution.

In order to support a feedback based technique for improving angular resolution, the receiving device may need to be configured to provide feedback regarding the received signal strength of communications beams that are neighbors of (or are adjacent to) a strongest BF-PRS communications beam. The receiving device may provide received signal strength reports of the strongest BF-PRS communications beam and neighboring (or adjacent) communications beams of one or more transmitting devices. As an illustrative example, the receiving device may be provided with a configuration parameter that specifies a number of neighboring (or adjacent) communications beams for each transmitting device for which to report received signal strengths. Alternatively, the configuration parameter may specify an index corresponding to an entry in a list of a number of neighboring (or adjacent) communications beams for each transmitting device.

Figure 12A:
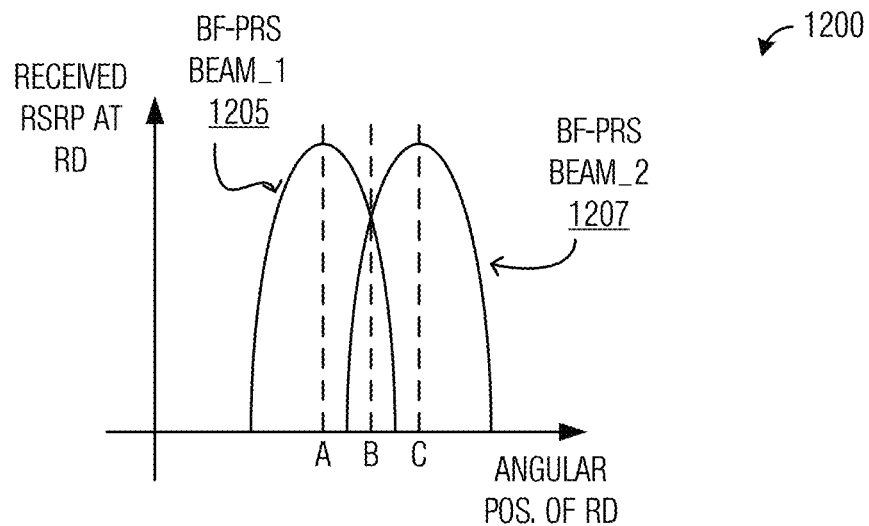
FIG. 12A illustrates a plot of the angular position of a receiving device vs signal strength at the receiving device according to example embodiments described herein.

FIG. 12A illustrates a plot 1200 of the angular position of a receiving device vs signal strength at the receiving device. Plot 1200 displays two curves corresponding to BF-PRSs transmitted on different communications beams, with a first curve 1205 representing the signal strength at the receiving device for a first communications beam and a second curve 1207 representing the signal strength at the receiving device for a second communications beam. As shown in FIG. 12A, the signal strength changes with the angular position of the receiving device. Three angular positions of the receiving device are noted: Point A corresponding to a maximum signal strength from the first communications beam, Point B corresponding to substantially equal signal strengths from the first communications beam and the second communications beam, and Point C corresponding to a maximum signal strength from the second communications beam.

Figure 12B:
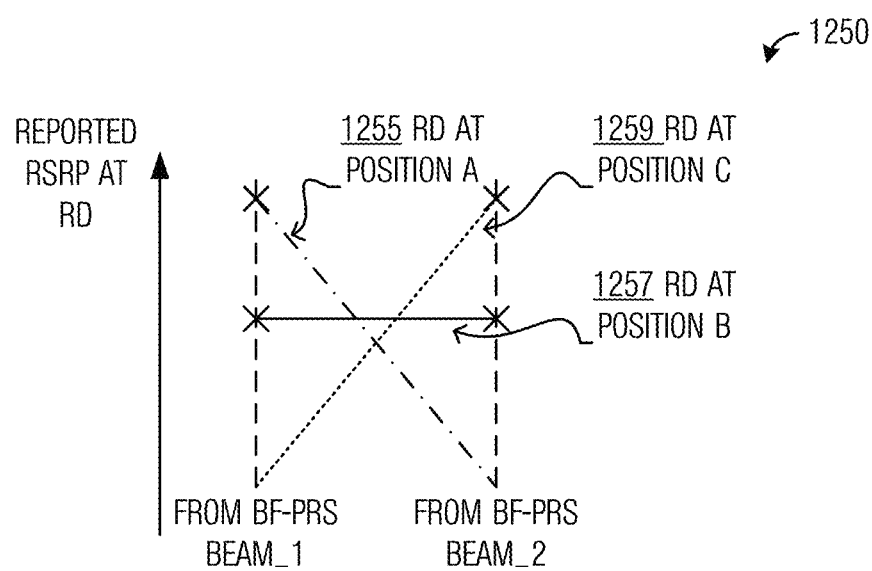
FIG. 12B illustrates a plot of reported signal strength at the receiving device vs the angular position of the receiving device according to example embodiments described herein.

FIG. 12B illustrates a plot 1250 of reported signal strength at the receiving device vs the angular position of the receiving device. Line 1255 represents the reported received signal strength from the BF-PRS transmitted on the first communications beam when the receiving device is at Point A. Line 1257 represents the reported received signal strength from the BF-PRSs transmitted on the first communications beam and the second communications beam when the receiving device is at Point B, and line 1259 represents the reported received signal strength from the BF-PRS transmitted on the second communications beam when the receiving device is at Point C.

As shown in plot 1250, the reported received signal strength from the first communications beam drops as the receiving device moves from Point A to Point B to Point C, while the reported signal strength from the second communications beam rises as the receiving device moves from Point A to Point B to Point C.

Interpolation between the received signal strength of neighboring or adjacent communications to improve angular resolution may occur at the LS. An LPPa protocol between a transmitting device and the LS may be used to convey the information as discussed previously. Alternatively, interpolation may occur at the transmitting device and an LPPa protocol may be used to convey AoD information to the LS.

In a first aspect, the present application provides a method for receiving device position determination. The method includes receiving, by a receiving device, BF-PRSs on a plurality of communications beams from at least two transmitting devices in accordance with a BF-PRS configuration, making, by the receiving device, at least one OTDOA measurement in accordance with the BF-PRSs on the plurality of communications beams, and transmitting, by the receiving device, OTDOA feedback including the at least one OTDOA measurement.

According to a first embodiment of the method according to the first aspect, the BF-PRS configuration includes at least one of indications of network resources used to convey the BF-PRSs to the receiving device, or a mapping of communications beam identifier to network resource for each transmitting device. According to a second embodiment of the method according to any preceding embodiment of the first aspect or the first aspect as such, making the at least one OTDOA measurement includes selecting, by the receiving device, at least one communications beam of each transmitting device in accordance with a selection criterion, identifying, by the receiving device, at least one transmitting device pair from the at least two transmitting devices in accordance with the at least one communications beam of each transmitting device, wherein the at least one transmitting device pair comprises one communications beam for each transmitting device in the at least one transmitting device pair, and determining, by the receiving device, the at least one OTDOA measurement in accordance with time of arrivals associated with the communications beams of the at least one transmitting device pair.

According to a third embodiment of the method according to any preceding embodiment of the first aspect or the first aspect as such, the OTDOA feedback further includes identifying information of communications beams of the at least one transmitting device pair, and received signal strengths of the BF-PRSs received on the communications beams of the at least one transmitting device pair. According to a fourth embodiment of the method according to any preceding embodiment of the first aspect or the first aspect as such, the OTDOA feedback further comprises received signal strengths of neighboring communications beams of the communications beams of the at least one transmitting device pair. According to a fifth embodiment of the method according to any preceding embodiment of the first aspect or the first aspect as such, the at least one communications beam of each transmitting device is selected in accordance with at least one of identifiers of the at least one communications beam of each transmitting device differ by more than a first minimum value, or the at least one OTDOA measurement is greater than a second minimum value.

In a second aspect, the present application provides a method for device position determination. The method includes transmitting, by a transmitting device, a BF-PRS configuration including at least one of indications of network resources used to convey the BF-PRSs to a receiving device, or a mapping of communications beam identifier to network resource for the transmitting device, and transmitting, by a transmitting device, BF-PRSs on a plurality of communications beams in accordance with the BF-PRS configuration.

According to a first embodiment of the method according to the second aspect, there is a plurality of transmitting devices, and the BF-PRS configuration also includes at least one of indications of network resources used to convey the BF-PRSs to the receiving device, or a mapping of communications beam identifier to network resource for at least one other transmitting device.

In a third aspect, the present application provides a method for position determination of a second device. The method includes receiving, by a first device, time difference of arrival (TDOA) feedback from a third device, the TDOA feedback includes at least one TDOA measurement, identifiers of communications beams associated with the at least one TDOA measurement, and determining, by the first device, a location of the second device in accordance with the TDOA feedback.

According to a first embodiment of the method according to the third aspect, the location of the second device is determined in accordance with a TRP-A including angular information of communications beams of transmitting or receiving devices and position information of third devices. According to a second embodiment of the method according to any preceding embodiment of the third aspect or the third aspect as such, the angular information includes a mapping of identifiers of communications beams to angles referenced to a specified direction. According to a third embodiment of the method according to any preceding embodiment of the third aspect or the third aspect as such, the TDOA feedback further comprises received signal strengths of BF-PRSs received on the communications beams associated with the at least one TDOA measurement.

According to a fourth embodiment of the method according to any preceding embodiment of the third aspect or the third aspect as such, the method further includes determining, by the first device, if the communications beams associated with the at least one TDOA measurement converge. According to a fifth embodiment of the method according to any preceding embodiment of the third aspect or the third aspect as such, the determining if the communications beams associated with the at least one TDOA measurement converges is in accordance with a TRP-A.

According to a sixth embodiment of the method according to any preceding embodiment of the third aspect or the third aspect as such, the method further includes updating, by the first device, a TRP-A in accordance with at least one of updates to a BF-PRS configuration or the location of the second device. According to a seventh embodiment of the method according to any preceding embodiment of the third aspect or the third aspect as such, he first device is a location server, the second device is a receiving device, and the third device is the receiving device. According to an eighth embodiment of the method according to any preceding embodiment of the third aspect or the third aspect as such, he first device is a location server, the second device is a transmitting device, and the third device is a receiving device.

In a fourth aspect, the present application provides a receiving device configured to perform measurements and information feedback. The receiving device includes one or more processors, and a computer readable storage medium storing programming for execution by the one or more processors. The programming including instructions to configure the receiving device to receive BF-PRSs on a plurality of communications beams from at least two transmitting devices in accordance with a BF-PRS configuration, make at least one OTDOA measurement in accordance with the BF-PRSs on the plurality of communications beams, and transmit OTDOA feedback including the at least one OTDOA measurement.

According to a first embodiment of the receiving device according to the fourth aspect, the programming includes instructions to configure the receiving device to one of receive the BF-PRS configuration from a single transmitting device, or receive subsets of the BF-PRS configuration from a plurality of transmitting devices. According to a second embodiment of the receiving device according to any preceding embodiment of the fourth aspect or the fourth aspect as such, the programming includes instructions to configure the receiving device to select at least one communications beam of each transmitting device accordance with a selection criterion, identify at least one transmitting device pair from the at least two transmitting devices in accordance with the at least one communications beam of each transmitting device, wherein the at least one transmitting device pair comprises one communications beam for each transmitting device in the at least one transmitting device pair, and determine the at least one OTDOA measurement in accordance with time of arrivals associated with the communications beams of the at least one transmitting device pair.

According to a third embodiment of the receiving device according to any preceding embodiment of the fourth aspect or the fourth aspect as such, the OTDOA feedback further includes identifiers of communications beams of the at least one transmitting device pair. According to a fourth embodiment of the receiving device according to any preceding embodiment of the fourth aspect or the fourth aspect as such, the OTDOA feedback further comprises received signal strengths of the BF-PRSs received on the communications beams of the at least one transmitting device pair.

In a fifth aspect, the present application provides a first device adapted to perform position determination of a second device is provided. The first device includes one or more processors, and a computer readable storage medium storing programming for execution by the one or more processors. The programming including instructions to configure the first device to receive TDOA feedback from a third receiving device, the TDOA feedback includes at least one TDOA measurement, identifiers of communications beams associated with the at least one TDOA measurement, and determine a location of the second device in accordance with the TDOA feedback.

According to a first embodiment of the first device according to the fifth aspect, the TDOA feedback further includes received signal strengths of BF-PRSs received on the communications beams associated with the at least one TDOA measurement. According to a second embodiment of the first device according to any preceding embodiment of the fifth aspect or the fifth aspect as such, the programming includes instructions to configure the first device to determine if the communications beams associated with the at least one TDOA measurement converge in accordance with a TRP-A comprising angular information of communications beams of transmitting and receiving devices and position information of third devices. According to a third embodiment of the first device according to any preceding embodiment of the fifth aspect or the fifth aspect as such, the programming includes instructions to configure the first device to update a TRP-A in accordance with at least one of updates to a BF-PRS configuration or the location of the second device.

Figure 13:
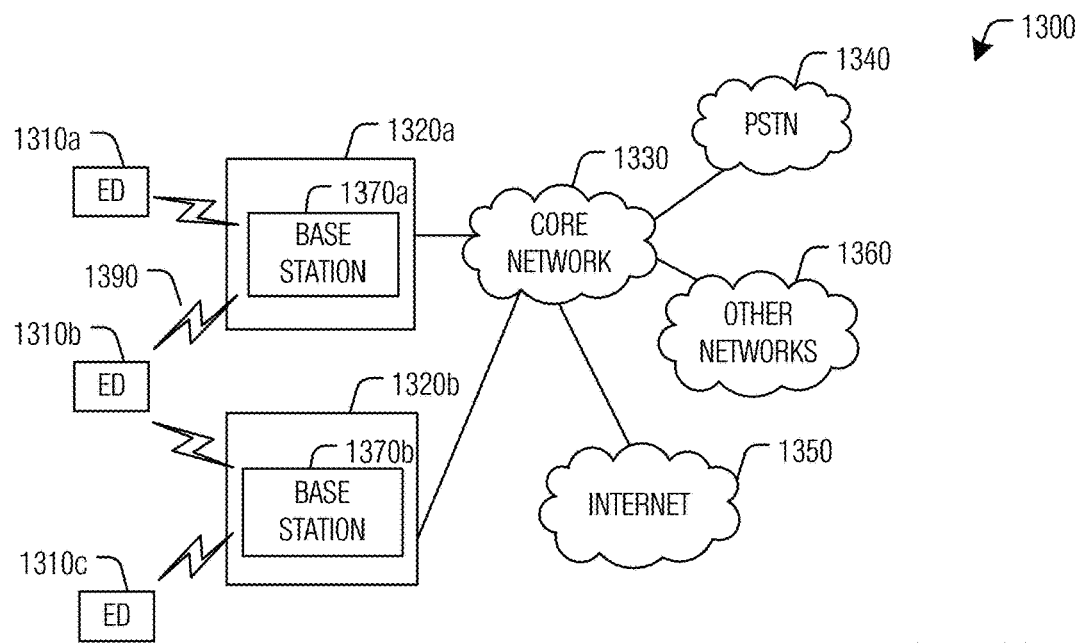
FIG. 13 illustrates an example communication system according to example embodiments described herein.

FIG. 13 illustrates an example communication system 1300. In general, the system 1300 enables multiple wireless or wired users to transmit and receive data and other content. The system 1300 may implement one or more channel access methods, such as code division multiple access (CDMA), time division multiple access (TDMA), frequency division multiple access (FDMA), orthogonal FDVIA (OFDMA), or single-carrier FDVIA (SC-FDVIA).

In this example, the communication system 1300 includes electronic devices (ED) 1310a-1310c, radio access networks (RANs) 1320a-1320b, a core network 1230, a public switched telephone network (PSTN) 1340, the Internet 1350, and other networks 1360. While certain numbers of these components or elements are shown in FIG. 13, any number of these components or elements may be included in the system 1300.

The EDs 1310a-1310c are configured to operate and/or communicate in the system 1300. For example, the EDs 1310a-1310c are configured to transmit and/or receive via wireless or wired communication channels. Each ED 1310a-1310c represents any suitable end user device and may include such devices (or may be referred to) as a UE, wireless transmit/receive unit (WTRU), mobile station, fixed or mobile subscriber unit, cellular telephone, personal digital assistant (PDA), smartphone, laptop, computer, touchpad, wireless sensor, or consumer electronics device.

The RANs 1320a-1320b here include base stations 1370a-1370b, respectively. Each base station 1370a-1370b is configured to wirelessly interface with one or more of the EDs 13100a-1310c to enable access to the core network 1330, the PSTN 1340, the Internet 1350, and/or the other networks 1360. For example, the base stations 1370a-1370b may include (or be) one or more of several well-known devices, such as a base transceiver station (BTS), a Node-B (NodeB), an evolved NodeB (eNodeB), a Home NodeB, a Home eNodeB, a site controller, an access point (AP), or a wireless router. The EDs 1310a-1310c are configured to interface and communicate with the Internet 1350 and may access the core network 1330, the PSTN 1340, and/or the other networks 1360.

In the embodiment shown in FIG. 13, the base station 1370a forms part of the RAN 1320a, which may include other base stations, elements, and/or devices. Also, the base station 1370b forms part of the RAN 1320b, which may include other base stations, elements, and/or devices. Each base station 1370a-1370b operates to transmit and/or receive wireless signals within a particular geographic region or area, sometimes referred to as a "cell." In some embodiments, multiple-input multiple-output (MIMO) technology may be employed having multiple transceivers for each cell.

The base stations 1370a-1370b communicate with one or more of the EDs 1310a-1310c over one or more air interfaces 1390 using wireless communication links. The air interfaces 1390 may utilize any suitable radio access technology.

It is contemplated that the system 1300 may use multiple channel access functionality, including such schemes as described above. In particular embodiments, the base stations and EDs implement LTE, LTE-A, and/or LTE-B. Of course, other multiple access schemes and wireless protocols may be utilized.

The RANs 1320a-1320b are in communication with the core network 1330 to provide the EDs 1310a-13100c with voice, data, application, Voice over Internet Protocol (VoIP), or other services. Understandably, the RANs 1320a-1320b and/or the core network 1330 may be in direct or indirect communication with one or more other RANs (not shown). The core network 1330 may also serve as a gateway access for other networks (such as the PSTN 1340, the Internet 1350, and the other networks 1360). In addition, some or all of the EDs 13100a-1310c may include functionality for communicating with different wireless networks over different wireless links using different wireless technologies and/or protocols. Instead of wireless communication (or in addition thereto), the EDs may communicate via wired communication channels to a service provider or switch (not shown), and to the Internet 1350.

Although FIG. 13 illustrates one example of a communication system, various changes may be made to FIG. 13. For example, the communication system 1300 could include any number of EDs, base stations, networks, or other components in any suitable configuration.

Figure 14A:
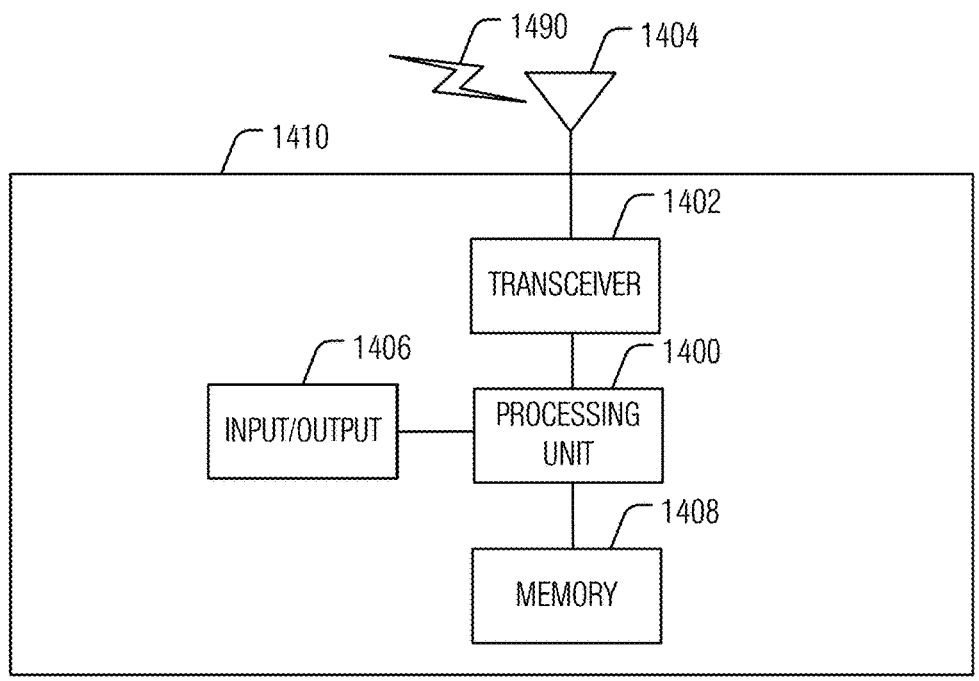
FIGS. 14A and 14B illustrate example devices that may implement the methods and teachings according to this disclosure.
Figure 14B:
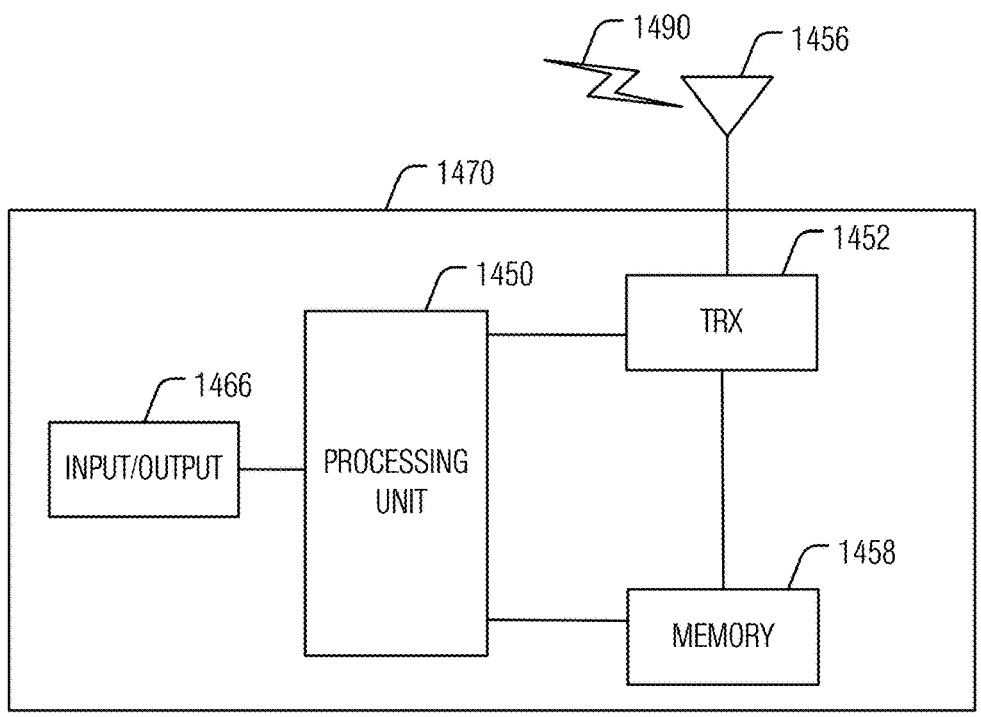

FIGS. 14A and 14B illustrate example devices that may implement the methods and teachings according to this disclosure. In particular, FIG. 14A illustrates an example ED 1410, and FIG. 14B illustrates an example base station 1470. These components could be used in the system 1300 or in any other suitable system.

As shown in FIG. 14A, the ED 1410 includes at least one processing unit 1400. The processing unit 1400 implements various processing operations of the ED 1410. For example, the processing unit 1400 could perform signal coding, data processing, power control, input/output processing, or any other functionality enabling the ED 1410 to operate in the system 1300. The processing unit 1400 also supports the methods and teachings described in more detail above. Each processing unit 1400 includes any suitable processing or computing device configured to perform one or more operations. Each processing unit 1400 could, for example, include a microprocessor, microcontroller, digital signal processor, field programmable gate array, or application specific integrated circuit.

The ED 1410 also includes at least one transceiver 1402. The transceiver 1402 is configured to modulate data or other content for transmission by at least one antenna or NIC (Network Interface Controller) 1404. The transceiver 1402 is also configured to demodulate data or other content received by the at least one antenna 1404. Each transceiver 1402 includes any suitable structure for generating signals for wireless or wired transmission and/or processing signals received wirelessly or by wire. Each antenna 1404 includes any suitable structure for transmitting and/or receiving wireless or wired signals. One or multiple transceivers 1402 could be used in the ED 1410, and one or multiple antennas 1404 could be used in the ED 1410. Although shown as a single functional unit, a transceiver 1402 could also be implemented using at least one transmitter and at least one separate receiver.

The ED 1410 further includes one or more input/output devices 1406 or interfaces (such as a wired interface to the Internet 1350). The input/output devices 1406 facilitate interaction with a user or other devices (network communications) in the network. Each input/output device 1406 includes any suitable structure for providing information to or receiving/providing information from a user, such as a speaker, microphone, keypad, keyboard, display, or touch screen, including network interface communications.

In addition, the ED 1410 includes at least one memory 1408. The memory 1408 stores instructions and data used, generated, or collected by the ED 1410. For example, the memory 1408 could store software or firmware instructions executed by the processing unit(s) 1400 and data used to reduce or eliminate interference in incoming signals. Each memory 1408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 14B, the base station 1470 includes at least one processing unit 1450, at least one transceiver 1452, which includes functionality for a transmitter and a receiver, one or more antennas 1456, at least one memory 1458, and one or more input/output devices or interfaces 1466. A scheduler, which would be understood by one skilled in the art, is coupled to the processing unit 1450. The scheduler could be included within or operated separately from the base station 1470. The processing unit 1450 implements various processing operations of the base station 1470, such as signal coding, data processing, power control, input/output processing, or any other functionality. The processing unit 1450 can also support the methods and teachings described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transceiver 1452 includes any suitable structure for generating signals for wireless or wired transmission to one or more EDs or other devices. Each transceiver 1452 further includes any suitable structure for processing signals received wirelessly or by wire from one or more EDs or other devices. Although shown combined as a transceiver 1452, a transmitter and a receiver could be separate components. Each antenna 1456 includes any suitable structure for transmitting and/or receiving wireless or wired signals. While a common antenna 1456 is shown here as being coupled to the transceiver 1452, one or more antennas 1456 could be coupled to the transceiver(s) 1452, allowing separate antennas 1456 to be coupled to the transmitter and the receiver if equipped as separate components. Each memory 1458 includes any suitable volatile and/or non-volatile storage and retrieval device(s). Each input/output device 1466 facilitates interaction with a user or other devices (network communications) in the network. Each input/output device 1466 includes any suitable structure for providing information to or receiving/providing information from a user, including network interface communications.

Figure 15:
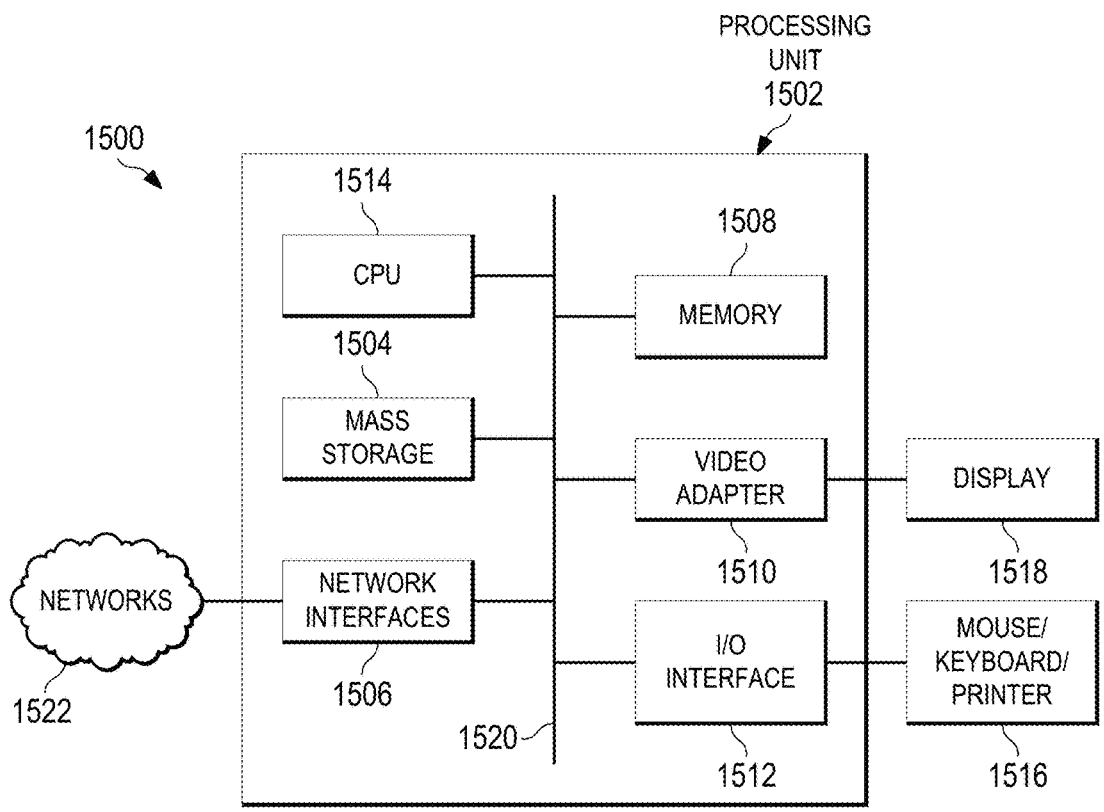
FIG. 15 is a block diagram of a computing system that may be used for implementing the devices and methods disclosed herein.

FIG. 15 is a block diagram of a computing system 1500 that may be used for implementing the devices and methods disclosed herein. For example, the computing system can be any entity of UE, AN, MM, SM, UPGW, AS. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1500 includes a processing unit 1502. The processing unit includes a central processing unit (CPU) 1514, memory 1508, and may further include a mass storage device 1504, a video adapter 1510, and an I/O interface 1512 connected to a bus 1520.

The bus 1520 may be one or more of any type of several bus architectures including a memory bus or memory controller, a peripheral bus, or a video bus. The CPU 1514 may comprise any type of electronic data processor. The memory 1508 may comprise any type of non-transitory system memory such as static random access memory (SRAM), dynamic random access memory (DRAM), synchronous DRAM (SDRAM), read-only memory (ROM), or a combination thereof. In an embodiment, the memory 1508 may include ROM for use at boot-up, and DRAM for program and data storage for use while executing programs.

The mass storage 1504 may comprise any type of non-transitory storage device configured to store data, programs, and other information and to make the data, programs, and other information accessible via the bus 1520. The mass storage 1504 may comprise, for example, one or more of a solid state drive, hard disk drive, a magnetic disk drive, or an optical disk drive.

The video adapter 1510 and the I/O interface 1512 provide interfaces to couple external input and output devices to the processing unit 1502. As illustrated, examples of input and output devices include a display 1518 coupled to the video adapter 1510 and a mouse/keyboard/printer

1516 coupled to the I/O interface 1512. Other devices may be coupled to the processing unit 1502, and additional or fewer interface cards may be utilized. For example, a serial interface such as Universal Serial Bus (USB) (not shown) may be used to provide an interface for an external device.

The processing unit 1502 also includes one or more network interfaces 1506, which may comprise wired links, such as an Ethernet cable, and/or wireless links to access nodes or different networks. The network interfaces 1506 allow the processing unit 1502 to communicate with remote units via the networks. For example, the network interfaces 1506 may provide wireless communication via one or more transmitters/transmit antennas and one or more receivers/receive antennas. In an embodiment, the processing unit 1502 is coupled to a local-area network 1522 or a wide-area network for data processing and communications with remote devices, such as other processing units, the Internet, or remote storage facilities.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a making unit/module, a selecting unit/module, an identifying unit/module, and/or a determining unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the present disclosure and its advantages have been described in detail, it should be understood that various changes, substitutions and alterations can be made herein without departing from the spirit and scope of the disclosure as defined by the appended claims.

What is claimed is:

1. A method for device position determination, the method comprising:
   receiving, by a device, beamformed position reference signals (BF-PRSs) on a plurality of beams from transmitting devices in accordance with a BF-PRS configuration;
   measuring, by the device, a first time difference (TD) between two BF-PRSs of the BF-PRSs received from two of the transmitting devices;
   measuring, by the device, a second TD between a different two BF-PRSs; and
   transmitting, by the device, a feedback message identifying the two BF-PRSs used for the measuring the first TD, wherein the feedback message further identifies the different two BF-PRSs.

2. The method of claim 1, wherein received signal strengths of the two BF-PRSs are indicated via feedback signaling transmitted by the device.

3. The method of claim 1, wherein signal strengths of neighboring beams are indicated via feedback signaling transmitted by the device, the neighboring beams being neighbors of beams over which the two BF-PRSs are received.

4. The method of claim 1, further comprising:
   selecting, by the device, the two BF-PRSs in accordance with the measured first TD based on a selection criteria.

5. The method of claim 1, wherein the feedback message specifies the measured first TD.

6. The method of claim 1, wherein the BF-PRS configuration indicates network resources used to communicate the BF-PRSs to the device.

7. The method of claim 1, wherein the BF-PRS configuration indicates a mapping of beams to network resources used to communicate the BF-PRSs to the device.

8. The method of claim 1, wherein times of reception of the two BF-PRSs are indicated via feedback signaling transmitted by the device.

9. A device comprising:
   a processor; and
   a non-transitory computer readable storage medium storing programming for execution by the processor, the programming including instructions to:
   receive beamformed position reference signals (BF-PRSs) on a plurality of beams from transmitting devices in accordance with a BF-PRS configuration;
   measure a first time difference (TD) between two BF-PRSs of the BF-PRSs received from at least two of the transmitting devices;
   measure a second TD between a different two BF-PRSs; and
   transmit a feedback message identifying the two BF-PRSs used for measuring the first TD, wherein the feedback message further identifies the different two BF-PRSs.

10. The device of claim 9, wherein the programming further includes instructions to transmit feedback signaling that indicates received signal strengths of the two BF-PRSs.

11. The device of claim 9, wherein the programming further includes instructions to transmit feedback signaling that indicates signal strengths of neighboring beams that are neighbors of beams over which the two BF-PRSs are received.

12. The device of claim 9, wherein the programming further includes instructions to:
   select the two BF-PRSs in accordance with the measured first TD based on a selection criteria.

13. The device of claim 9, wherein the feedback message specifies the measured first TD.

14. The device of claim 9, wherein the BF-PRS configuration indicates network resources used to communicate the BF-PRSs to the device.

15. The device of claim 9, wherein the BF-PRS configuration indicates a mapping of beams to network resources used to communicate the BF-PRSs to the device.

16. The device of claim 9, wherein the programming further includes instructions to receive feedback signaling that indicates times of reception of the two BF-PRSs.

17. A method for device position determination, the method comprising:
   transmitting, by a first transmitting device, a beamformed position reference signal (BF-PRS) configuration to a device;
   transmitting, by the first transmitting device, a first BF-PRS on at least a first beam in a plurality of beams to the device in accordance with a BF-PRS configuration; and
   receiving, by the first transmitting device, a feedback message identifying the first BF-PRS and a second BF-PRS transmitted from a second transmitting device to the device over a second beam in the plurality of beams in accordance with the BF-PRS configuration.

18. The method of claim 17, wherein received signal strengths of the first BF-PRS and the second BF-PRS are indicated via feedback signaling received by the first transmitting device.

19. The method of claim 17, wherein signal strengths of neighboring beams are indicated via feedback signaling received by the first transmitting device, the neighboring beams being neighbors of beams over which the first BF-PRS and the second BF-PRS are received.

20. The method of claim 17, wherein the feedback message specifies a time difference measurement between the first BF-PRS and the second BF-PRS.

21. The method of claim 17, wherein the BF-PRS configuration indicates network resources used to communicate the first BF-PRS and the second BF-PRS to the device.

22. The method of claim 17, wherein the BF-PRS configuration indicates a mapping of the first beam and the second beam to network resources used to communicate the first BF-PRS and the second BF-PRS to the device.

23. A first transmitting device comprising:
a processor; and
a non-transitory computer readable storage medium storing programming for execution by the processor, the programming including instructions to:
transmit a beamformed position reference signal (BF-PRS) configuration to a device;
transmit a first BF-PRS on at least a first beam in a plurality of beams to the device in accordance with a BF-PRS configuration; and
receive, from the device, a feedback message identifying the first BF-PRS and a second BF-PRS transmitted from a second transmitting device to the device over a second beam in the plurality of beams in accordance with the BF-PRS configuration.

24. The first transmitting device of claim 23, wherein the programming further includes instructions to receive feedback signaling that indicates signal strengths of the first BF-PRS and the second BF-PRS.

25. The first transmitting device of claim 23, wherein the programming further includes instructions to receive feedback signaling that indicates signal strengths of neighboring beams that are neighbors of beams over which the first BF-PRS and the second BF-PRS are received.

26. The first transmitting device of claim 23, wherein the feedback message specifies a time difference measurement between the first BF-PRS and the second BF-PRS.

27. The first transmitting device of claim 23, wherein the BF-PRS configuration indicates network resources used to communicate the first BF-PRS and the second BF-PRS to the device.

28. The first transmitting device of claim 23, wherein the BF-PRS configuration indicates a mapping of the first beam and the second beam to network resources used to communicate the first BF-PRS and the second BF-PRS to the device.

* * * * *